(12) United States Patent
Arai et al.

(10) Patent No.: US 8,028,579 B2
(45) Date of Patent: Oct. 4, 2011

(54) VIBRATION BODY FOR ANGULAR SPEED SENSOR

(75) Inventors: Isao Arai, Saitama (JP); Yoichi Nagata, Saitama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 643 days.

(21) Appl. No.: 12/096,858

(22) PCT Filed: Jan. 11, 2007

(86) PCT No.: PCT/JP2007/050207
§ 371 (c)(1),
(2), (4) Date: Jun. 10, 2008

(87) PCT Pub. No.: WO2007/080908
PCT Pub. Date: Jul. 19, 2007

(65) Prior Publication Data
US 2009/0288486 A1    Nov. 26, 2009

(30) Foreign Application Priority Data

Jan. 13, 2006    (JP) .................................. 2006-005574

(51) Int. Cl.
*G01P 9/04* (2006.01)
*G01C 19/56* (2006.01)
(52) U.S. Cl. .................................. 73/504.12; 73/504.16
(58) Field of Classification Search ............... 73/504.16, 73/504.12, 504.04, 504.15, 493; 310/370
See application file for complete search history.

(56) References Cited

U.S. PATENT DOCUMENTS

| 6,134,963 | A   |    | 10/2000 | Ishikawa et al. |
|-----------|-----|----|---------|------------------|
| 6,647,786 | B2  | *  | 11/2003 | Ohta et al. ................. 73/504.16 |
| 6,810,735 | B2  | *  | 11/2004 | Kaneko et al. .................. 73/493 |
| 6,880,399 | B1  | *  | 4/2005  | Okoshi et al. .................. 73/493 |
| 7,096,733 | B2  | *  | 8/2006  | Ohta et al. ................. 73/504.16 |
| 7,127,945 | B2  | *  | 10/2006 | Ookoshi ......................... 73/493 |
| 7,456,555 | B2  | *  | 11/2008 | Matsudo et al. ............. 310/370 |

(Continued)

FOREIGN PATENT DOCUMENTS

EP    0-995-972 A1    4/2000

(Continued)

OTHER PUBLICATIONS

International Search Report of PCT/JP2007/050207; date of mailing Feb. 13, 2007.

(Continued)

*Primary Examiner* — Helen C. Kwok
(74) *Attorney, Agent, or Firm* — Westerman, Hattori, Daniels & Adrian, LLP

(57) ABSTRACT

A vibration body for angular speed sensor has a vibrator that includes vibration pieces, a supporting part for supporting the vibration pieces, and a mounting substrate for mounting the vibrator. The mounting substrate has a seat part for fixing the supporting part and supporting the vibrator and a base part. The seat part has a level difference representing a predetermined height from the base part. The predetermined height is set larger than an oscillation width of the vibration pieces. The seat part also has an edge portion that has a shape of a curved line, and each line in a direction perpendicular to each position on the edge portion determines a mounting angle for mounting the vibrator and has an angle in the same direction as a reference direction defined in the mounting substrate or in a direction at least one being different from it.

17 Claims, 19 Drawing Sheets

U.S. PATENT DOCUMENTS

| | | | |
|---|---|---|---|
| 7,639,096 B2 * | 12/2009 | Ikeda et al. | 331/154 |
| 2003/0146358 A1 | 8/2003 | Kaneko et al. | |
| 2005/0120794 A1 | 6/2005 | Ohta et al. | |
| 2007/0188045 A1 * | 8/2007 | Ikeda et al. | 310/311 |

FOREIGN PATENT DOCUMENTS

| | | |
|---|---|---|
| JP | 09-318364 A | 12/1997 |
| JP | 10-19922 A | 1/1998 |
| JP | 10-197254 A | 7/1998 |
| JP | 11-094554 A | 4/1999 |
| JP | 2002-022452 A | 1/2002 |
| JP | 2003-069368 A | 3/2003 |
| JP | 2003-227844 A | 8/2003 |
| WO | 99/02943 A1 | 1/1999 |
| WO | 03/100350 A1 | 12/2003 |
| WO | 2005/090912 A1 | 9/2005 |

OTHER PUBLICATIONS

Chinese Office Action dated Jun. 2, 2010, issued in corresponding Chinese Patent Application No. 200780002124.1.

Japanese Office Action dated Jun. 2, 2010, issued in corresponding Japanese Patent Application No. 2007800021241.

Japanese Office Action date Feb. 2, 2011, issued in corresponding Japanese Patent Application No. 2007-553925.

* cited by examiner

FIG. 9A
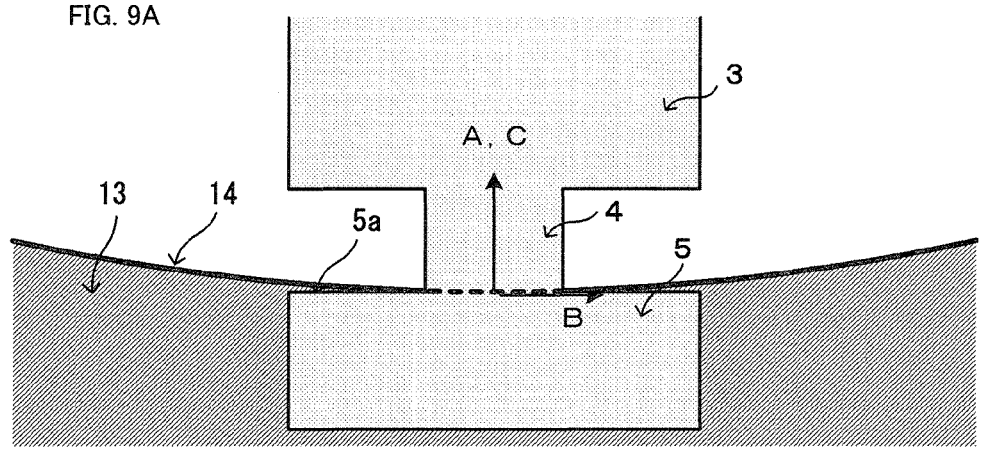
FIG. 9B
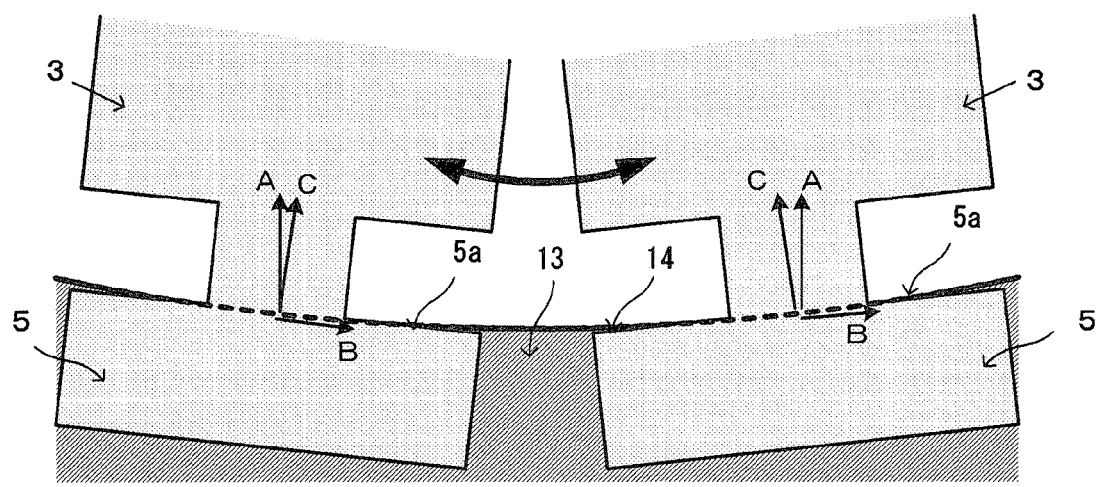

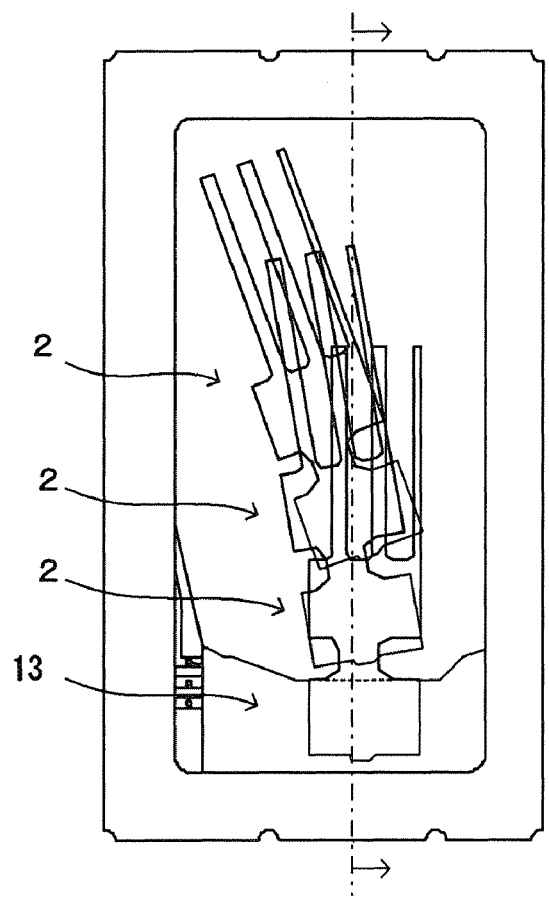 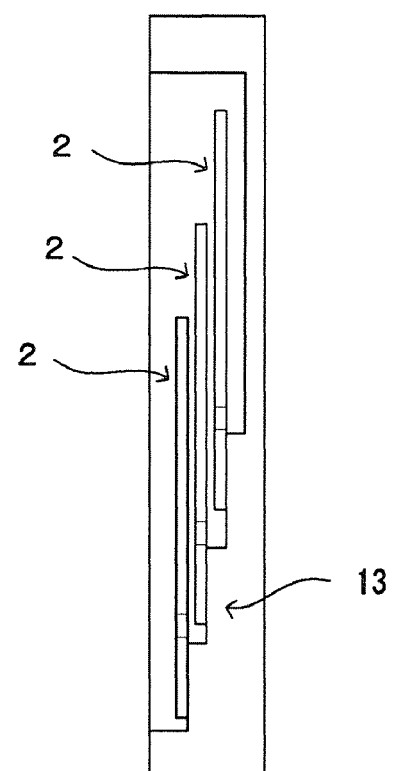

VIBRATION BODY FOR ANGULAR SPEED SENSOR

TECHNICAL FIELD

The present invention relates to a vibration body for angular speed sensor, and more particularly, it relates to a configuration for mounting a vibrator on a mounting substrate.

BACKGROUND ART

An angular speed sensor (a gyro instrument) is employed for an attitude control and a navigation system of a mobile object, such as an airplane and a vehicle, and this sensor detects an angular speed of the mobile object by detecting a Coriolis signal associated with the angular speed.

As for the navigation system, when a current position is detected for the mobile object such as a vehicle equipped with the navigation system, there is known a method of measuring a traveling direction and a travel distance of the mobile object from a predetermined position, in addition to a method of conducting measurement by using the GPS (Global Positioning System). It is also known that in this measuring method based on the traveling direction and the travel distance, the current position, the traveling direction, and speed variation of the mobile object are detected, by using an angular speed sensor and an acceleration sensor.

In the case above, when the direction and magnitude of the acceleration or the like are detected, a detection axis is set for each of the sensors as a reference. On the premise that this detection axis is parallel with the traveling direction (e.g., a road surface), each parameter of each of the sensors is set, and these sensors are installed and fixed within the navigation system. In general, when the navigation system is provided within a vehicle, it is installed and fixed in such a manner as being parallel with a horizontal plane (ground surface) in the vehicle.

Furthermore, in general, the navigation system is installed on a front panel surface such as a central console, for instance, within the vehicle. When the navigation system is installed on the front panel surface such as the central console, it is required to enhance visibility of a display surface provided on the navigation system, as well as enhancing operability of buttons and switches. Therefore, the display surface and the surface including these buttons and switches are configured in such a manner as having an angular position facing slightly upward with respect to the vertical direction.

Therefore, the navigation system is installed on the front panel surface in such a manner that the rear part of the navigation system (forward of the vehicle) is set to be lower position in the vertical direction. Accordingly, the navigation system is installed being inclined with respect to the front panel surface of the vehicle.

The mounting position of this navigation system on the front panel surface varies depending on the vehicle types, options set by a user, or the like, and various positions are possible such as upper side or lower side of the central console. Therefore, depending on where the navigation system is installed on the front panel surface, various mounting angles (the angles with respect to the horizontal direction) of the navigation system are possible. For example, if the navigation system is provided on the lower position on the central console, it is required to improve the visibility, and therefore, the navigation system should be upward leaning much more than the case where it is provided on the upper position on the front panel surface.

When the navigation system is installed on the vehicle at a certain angle as described above, there is a possibility that the angle exceeds an allowable value which is preset in the angular speed sensor.

On such an occasion above, the direction of the detection axis that is preset in each of the sensors in the navigation system may be largely different from the direction (horizontal direction) of the acceleration or the like, which is applied on each of the sensors when detection is actually performed. Therefore, errors such as an offset of sensitivity of the sensor itself may be included, and thereby causing a problem that positioning accuracy as to the vehicle current position and measurement accuracy as to the speed are deteriorated.

By way of example, patent document 1 discusses this subject above and suggests a configuration to solve the problem. FIG. 18 is a sectional view illustrating the central console on which the navigation system is mounted. According to the description in the document, the navigation system 100 is inclined with respect to the horizontal direction from the state before mounted on the central console 110 (FIG. 18(A)), so that the display surface 102 is installed facing upwardly along with the inclination of the central console 110. Then, the detection axis 103 of the acceleration sensor 101 is also inclined by $\theta$ with respect to the horizontal direction, in accordance with the mounting angle $\theta$ of the navigation system 100 (FIG. 18(B) and FIG. 18(C)).

If it is assumed that the vehicle drives forward (rightward in FIG. 18), the acceleration "Ax" is applied to the navigation system in the direction that is opposite to the forward movement. In addition, the acceleration "Az" is applied to the acceleration sensor 101 in the vertical direction, which is caused by the vehicle vibration and an impactive force from the ground.

As shown in FIG. 18(A), when the navigation system is in the state being horizontal, the acceleration sensor 101 receives the horizontal acceleration Ax and the vertical acceleration Az as the accelerations in the respective directions. However, as shown in FIG. 18(B) and FIG. 18(C), when the navigation system in the state being inclined, the acceleration sensor 101 detects the horizontal acceleration, as the vector sum At ($=Gx+Gz=\cos\theta \times Ax + \sin\theta \times Az$) according to the inclination, based on the horizontal acceleration Ax and the vertical acceleration Az.

Since the resultant acceleration "At" is different from the acceleration "Ax" that is to be actually detected, this error may cause a deterioration of positioning accuracy or the like, as to the current position of the vehicle. As the mounting angle $\theta$ of the navigation system 100 increases, the component of the acceleration "Ax" of the vehicle in the traveling direction is more deteriorated and influence from the vertical acceleration "Az" becomes more remarkable, thus leading to a noticeable error.

As for the angular speed sensor, similar to the above acceleration sensor, an error may occur due to the mounting angle onto the vehicle, thereby causing deterioration in the positioning accuracy.

If this error is corrected utilizing software, there is a problem that sufficient compensation cannot be obtained in the initial state, and there is also a problem that when the mounting angle is large, it is difficult to carry out the compensation. In addition, there is another problem in manufacturing cost and the like. Therefore, the patent document discloses a configuration in which a mounting slit is formed at a mounting angle being inclined, in a mounting member which fixedly supports a sensing unit, and the sensing unit is engaged with the mounting slit.

Patent document 1: Japanese Unexamined Patent Application Publication No. 2003-227844

DISCLOSURE OF THE INVENTION

Problems to be Solved by the Invention

In the configuration where the mounting slit is formed on the mounting member, the counting slit being inclined at a mounting angle, and the sensing unit is engaged in this mounting slit to be fixedly supported, there is a problem that an inclination being compensable is limited to this inclined angle. In addition, there is another problem that in order to correct more than one inclination, it is necessary to prepare multiple mounting members which have various slit inclination angles respectively for the multiple inclinations.

In general, the mounting angle of the navigation system varies depending on the state how the navigation system is installed. On the other hand, once an angular speed sensor is mounted on the navigation system, it is difficult for the navigation system to change the mounting angle of the angular speed sensor after it is mounted.

In view of the situation above, a supplier of the navigation system prepares angular speed sensors complying with various mounting angles, and supplies an angular speed sensor that is appropriate for a mounting angle of the navigation system. In order to constitute the angular speed sensors respectively complying with various mounting angles, it is required that the mounting angle can be set with a high degree of flexibility when the sensing unit is mounted on the mounting member.

In the configuration where the slit is provided in the mounting member, which is suggested by the aforementioned document, it is necessary to prepare a mounting member having a slit appropriate for each of the various mounting angles, and the mounting angles are limited to the slits being prepared. Therefore, there is only a low degree of flexibility in the mounting angle.

When a vibrator is mounted on a mounting substrate such as a package, so as to configure a vibration body, the position for mounting the vibrator on the mounting substrate can be arbitrarily determined, as far as the vibrator is set within the range that accommodates the vibrator in the area of the mounting substrate.

However, in the vibration body containing the vibrator, it is necessary that the vibrator can oscillate freely. Therefore, the vibrator is required to be mounted, keeping the vibrator from contact with the mounting substrate. When the vibrator comes into contact with the mounting substrate, oscillation of the vibrator does not follow the angular speed. If the vibration body as such is employed, the detection accuracy of the angular speed sensor may be deteriorated.

When the vibrator is mounted on the mounting substrate, it is configured in such a manner that the vibrator has a base on one edge thereof and further the base is provided with a supporting part, placing a constricted part therebetween. A member for mounting the vibrator has a configuration including a seat part with a level difference above the mounting substrate, and the supporting part is mounted on the seat part.

In the aforementioned configuration where the supporting part of the vibrator is mounted on the seat part, as described below, it is not possible to mount a vibrator at an arbitrary position on the mounting substrate, due to a limit of the mounting positions of the seat part and the supporting part.

FIG. 19 illustrates a positional relationship between the supporting part of the vibrator and the seat part. It is to be noted that FIG. 19 shows an ideal positional relationship between the supporting part of the vibrator and the seat part.

In FIG. 19, multiple vibration pieces 7, not illustrated, are connected to the base 3, and the vibrator is supported by the supporting part 5 via the constricted part 4, in such a manner as freely oscillating.

In mounting the vibrator 2 onto the seat part 13, the following two points are required, with regard to the positional relationships between the constricted part and the seat part, and between the supporting part and the seat part.

The point required by the positional relationship between the constricted part and the seat part is to perform supporting without impeding oscillation of the vibration pieces, and it is required that only the supporting part 5 is fixed on the seat part 13, and the constricted part 4 being oscillating has to be mounted without coming into contact with the seat part 13. If the constricted part 4 comes into contact with the seat part 13, the oscillation of the constricted part 4 is impeded, causing an error in the oscillation of the vibration pieces. Therefore, it is necessary to mount the constricted part 4 without coming into contact with the seat part 13.

On the other hand, the point required by the positional relationship between the supporting part and the seat part is to stably fix the vibrator, and it is required to expand a contact area between the supporting part 5 and the seat part 13. Since the area of the supporting part 5 is determined by the vibrator 2, it is required that the entire area of the supporting part 5 should be fully brought into contact with the seat part 13.

FIG. 19(B) to FIG. 19(D) all illustrate a state that an end portion 5a of the supporting part 5 is deviated from the edge portion 14 of the seat part 13. FIG. 19(B) illustrates a state that the end portion 5a is deviated from the edge portion 14, and thereby the supporting part 5 partially comes off the seat part 13 and the area RA is not brought into contact therewith. In this state, the contact area is decreased by the area RA, and for the decreased area, the fixed state of the vibrator 2 becomes instable.

FIG. 19(C) illustrates the state that the end portion 5a is deviated from the edge portion 14, whereby the supporting part 5 partially comes off the seat part 13, and the area RB is not brought into contact therewith, as well as the area RC being a portion of the constricted part 4 is in contact with the seat part 13. In this state, the contact area is decreased by the area RB, and for the decreased area, the fixed state of the vibrator 2 becomes instable. Furthermore, contact of the area RC with the seat part 13 may give an impact on the oscillation state of the vibrator.

In addition, FIG. 19(D) illustrates a state that the constricted part 4 is in contact with the seat part 13 at the area RD. In this state, the oscillation of the constricted part 4 is restricted by the seat part 13, and therefore the oscillation of the vibration pieces may be disturbed.

As discussed above, the positional relationship between the supporting part of the vibrator and the seat part is required to have an arrangement such that the end portion of the supporting part coincides with the edge portion of the seat part.

In particular, within the mounting substrate that has a restricted area, it is required that the aforementioned conditions are satisfied as well as the mounting angle of the vibrator can be configured at any angle within a predetermined angle range, without limiting the angle to only one.

Here, since the vibrator is made of quartz crystal, a curved processing incurs a high cost. Therefore, in general, the end portion 5a of the supporting part 5 is linearly processed. In mounting the vibrator, in order to achieve a preferable relationship between the constricted part position and the seat part position, it is necessary to form the seat part so that the above requirements are satisfied.

Given the situation above, an object of the present invention is made to solve the conventional problems, and when a vibrator provided in a vibration body for angular speed sensor is mounted, oscillation of the vibrator is not impeded and preferable fixing of the vibrator is achieved, as well as the vibrator can be set at any angle within a predetermined angle range.

More specifically, an object of the present invention is to configure a seat part that allows the end portion of the supporting part of the vibrator to coincide with the edge portion of the seat part for supporting the vibrator, at multiple mounting angle positions of the vibrator.

Means to Solve the Problems

A vibration body for angular speed sensor according to the present invention forms a shape of a seat part in such a manner that a positional relationship between the seat part to which the vibrator is fixed and a supporting part of the vibrator is kept constant irrespective of a mounting angle of the vibrator, when a vibrator is mounted on a mounting substrate, whereby oscillation of the vibrator is not impeded and the vibrator is fixed preferably, as well as allowing the vibrator to be set at any angle within a predetermined angle range.

The vibration body for angular speed sensor according to the present invention is provided with a vibrator having vibration pieces and the supporting part for supporting the vibration pieces, and the mounting substrate for mounting the vibrator.

According to a first aspect of the present invention, the mounting substrate includes a base part and the seat part for supporting the vibrator by fixing the supporting part of the vibrator thereto. The seat part has a level difference from the base part, larger than an oscillation width of the vibration pieces, also provided with a curved edge portion, and each normal line at each position on the edge portion has an angle in the same direction as a reference direction defined in the mounting substrate, or in a direction at least one being different therefrom.

In mounting the vibrator on the seat part, the tangential projection of the end portion of the supporting part on the vibration pieces side coincides with the tangential projection of the edge portion of the seat part at the mounting position selected from the curved edge portion of the seat part, and according to position adjustment between the end portion and the edge portion, the mounting angle of the vibrator on the mounting substrate is determined by the normal line direction of the edge portion of the seat part.

Since the normal line direction at each position of the curved edge portion of the seat part defines the mounting angle of the vibrator, the vibrator is mounted in such a manner as being aligned with the edge portion of the seat part, and thereby oscillation of the vibrator is not impeded and the vibrator is fixed preferably, as well as the vibrator can be mounted at any angle within a predetermined angle range.

In the first aspect, following two configurations are possible as the present invention. In the first configuration, multiple angles that allow the vibrator to be mounted on the mounting substrate are on the positions which are defined by rotating the vibrator about a virtually determined rotation center.

In the first configuration, the curved shape of the edge portion of the seat part has a circular arc shape, and the center and radius of this circular arc respectively correspond to the virtually determined rotation center and a distance from this rotation center to the end portion of the supporting part of the vibrator. This rotation center is virtually determined so that the vibrator can be mounted on the mounting substrate at different mounting angles.

Accordingly, when the vibrator is mounted on different positions on the edge portion of the seat part, the vibrator takes each position that is defined by rotating the vibrator about a virtually determined point. By arranging the vibrator on the mounting substrate as such, it is possible to mount the vibrator at various angles on the substrate that has only a limited area.

The rotation center described above may be on contour of the vibrator or inside thereof, and alternatively, it may be outside the contour of the vibrator.

In the second configuration, as for the multiple angle positions that allow the vibrator to be mounted on the mounting substrate, a virtually defined rotation center for the vibrator is not only one point, but it may be assumed that more than one center point is placed on a continuous curved line.

In the second configuration, the curved line shape of the edge portion has a shape of curved line that is formed by the end portion of the supporting part of the vibrator, along with a locus formed by joining the mounting positions that can be taken successively, out of the multiple mounting positions taken by the vibrator on the mounting substrate. The center and the radius of the curvature at each position on the curved line respectively correspond to the rotation center that is virtually defined by the vibrator at the successive mounting positions, and a distance from the rotation center to the end portion of the supporting part.

With this configuration, when the vibrator is mounted at different positions on the edge portion of the seat part, each position of the vibrator forms a locus having the rotation center that is virtually defined. The locus may be assumed as a result of rotary movement around the rotation center on the continuous curved line. By arranging the vibrator as such on the mounting substrate, it is possible to mount the vibrator at various angles on the mounting substrate that has only a limited area.

In the first aspect of the invention, the range of the mounting angle of the vibrator onto the mounting substrate may be at least 30 degrees, and the range of the normal line direction of the seat part may also be at least 30 degree in conformity to range of the mounting angle.

In the first aspect of the invention, there is provided at least one marker that aligns with a part of the contour of the vibrator, when the vibrator is mounted at a predetermined angle.

When the vibrator is mounted onto the mounting substrate, it is checked whether or not this marker aligns with a part of the vibrator, whereby it is possible to check whether or not the vibrator is mounted at a predetermined angle.

The marker that is used as an index for alignment relating to the mounting angle of the vibrator may be set on the surface of the base part of the mounting substrate, or it may be set on a circuit board that is provided on the base part.

The vibration body for angular speed sensor is provided with a circuit board for subjecting a detection signal from the vibration pieces to a signal processing, and this circuit board may be placed on the base part. A marker that aligns with a part of the contour of the vibrator is set on the circuit board, and this circuit board is installed on the base part, whereby when the vibrator is mounted at a predetermined angle, this marker can be used as an index relating to the mounting angle of the vibrator. The marker can be formed by an opening provided on the circuit board, and this opening can be formed simultaneously with an opening for terminal connection that is provided on the surface protection film such as polyimide. The circuit board may be an IC chip.

In addition, the seat part is provided with a wall part that corresponds to the shape of curved line of the edge portion, and has a shape similar to this curved surface. This wall part is engaged with the end portion of the supporting part of the vibrator, allowing the positioning of vibrator in the longitudinal direction.

The wall part may be provided with at least one concave portion associated with the projecting portion that is provided on the end portion of the supporting part of the vibrator, in accordance with a predetermined mounting angle of the vibrator. The projecting portion referred to as "burr", which is formed on the supporting part of the vibrator during production or the like, is brought into contact with the wall part. With the concave portion, it is possible to avoid a problem that may occur in alignment by making said projecting portion not to contact with the wall part.

The second aspect of the present invention is directed to a vibration body for angular speed sensor, similar to the first aspect, including a vibrator that has vibration pieces and a supporting part for supporting the vibration pieces, and a mounting substrate for mounting the vibrator.

In the second aspect of the invention, the supporting part of the vibrator has a shape made up of a part of circular. The seat part in the mounting substrate for fixing the supporting part to support the vibrator has a level difference from the base part of the mounting substrate, larger than an oscillation width of the vibration pieces. In addition, the seat part has a circular shape having the same radius as the circular shape of the supporting part of the vibrator.

In mounting the vibrator onto the seat part, the center of the circular shape of the seat part is set to be a rotation center that is defined virtually by the vibrator, when it is mounted on the mounting substrate at each of different angles.

According to the second aspect of the invention, both the supporting part of the vibrator and the seat part of the mounting substrate have a circular shape. By using this circular shaped seat part as a center portion, the vibrator can be mounted at different mounting angles.

The seat part according to the second aspect of the invention is provided with a wall part having a circular arc shape, having the same center as that of the circular shape and a radius obtained by adding an allowance to the radius of the circular shape, and surrounding a part of the circular shape. This wall part is engaged with a circular shaped portion of the supporting part of the vibrator, so as to perform the positioning of the supporting part of the vibrator.

In addition, the wall part according to the second aspect of the invention includes at least one concave portion that is associated with the projecting portion provided to the end portion of the supporting part of the vibrator, in accordance with the predetermined mounting angle of the vibrator. According to the concave portion, similar to the first aspect of the invention, it is possible to avoid a problem that may occur in alignment in which the projecting portion referred to as "burr", which is formed on the supporting part of the vibrator during production or the like, may be brought into contact with the wall part.

The third aspect of the invention, similar to the first aspect thereof, is directed to a vibration body for angular speed sensor having a vibrator including vibration pieces and a supporting part for supporting the vibration pieces, and a mounting substrate for mounting the vibrator.

The third aspect of the invention is the same as the first aspect thereof except that the shape of the edge portion of the seat part has a shape made up of a combination of multiple straight lines, and each normal line at each position on the edge portion has an angle in the same direction as a reference direction defined in the mounting substrate, or in a direction at least one being different therefrom.

According to the third aspect of the invention, the mounting angle cannot be selected successively as in the first aspect of the invention. However, multiple straight sections associated with the predetermined mounting angles are prepared in advance, and a straight section associated with a desired mounting angle is selected from the lines above. Then, the end portion of the vibrator is aligned with the straight section, whereby the vibrator can be mounted at the mounting angle being selected.

EFFECT OF THE INVENTION

According to the present invention, in mounting the vibrator to be placed in the vibration body for angular speed sensor, it is possible to avoid impeding the oscillation of the vibrator and achieve a preferable fixing of the vibrator. In addition, the vibrator can be set at any angle within a predetermined angle range.

Further, according to various aspects of the present invention, it is possible to configure a seat part that allows the end portion of the supporting part of the vibrator to coincide with the edge portion of the seat part for supporting the vibrator, at multiple mounting angle positions. By using this seat part, the vibrator can be mounted onto the mounting substrate at a desired mounting angle.

BRIEF DESCRIPTION OF THE DRAWINGS

FIG. 9 illustrates an overlapping state between the supporting part of the vibrator and the seat part according to the present invention;

FIG. 17 illustrates a configuration where the edge portion of the seat part of the vibration body according to the present invention is made up of more than one straight line;

DESCRIPTION OF THE MARKS

1 VIBRATION BODY
2 VIBRATOR
3 BASE
4 CONSTRICTED PART
5 SUPPORTING PART
5a END PORTION
5b REAR END PORTION
5c PROJECTING PORTION
6 TERMINAL
7 VIBRATION PIECES
8 WIRE BONDING
11 MOUNTING SUBSTRATE
12 BASE PART
13 SEAT PART
14 EDGE PORTION
15 WIRING PART
16 WALL PART
16a CONCAVE PORTION
17 CONTACT TERMINAL
18 WIRING
19 FRAME PART
20 MARKER
30 CIRCUIT BOARD
31 OPENING
32 MARKER
33 WIRING
100 NAVIGATION SYSTEM
101 ACCELERATION SENSOR
102 DISPLAY
103 DETECTION AXIS
110 CONSOLE
111 OPERATION PANEL

BEST MODE FOR CARRYING OUT THE INVENTION

Hereinafter, the vibration body for angular speed sensor according to the present invention will be explained in detail, with reference to the accompanying drawings.

Figure 1:
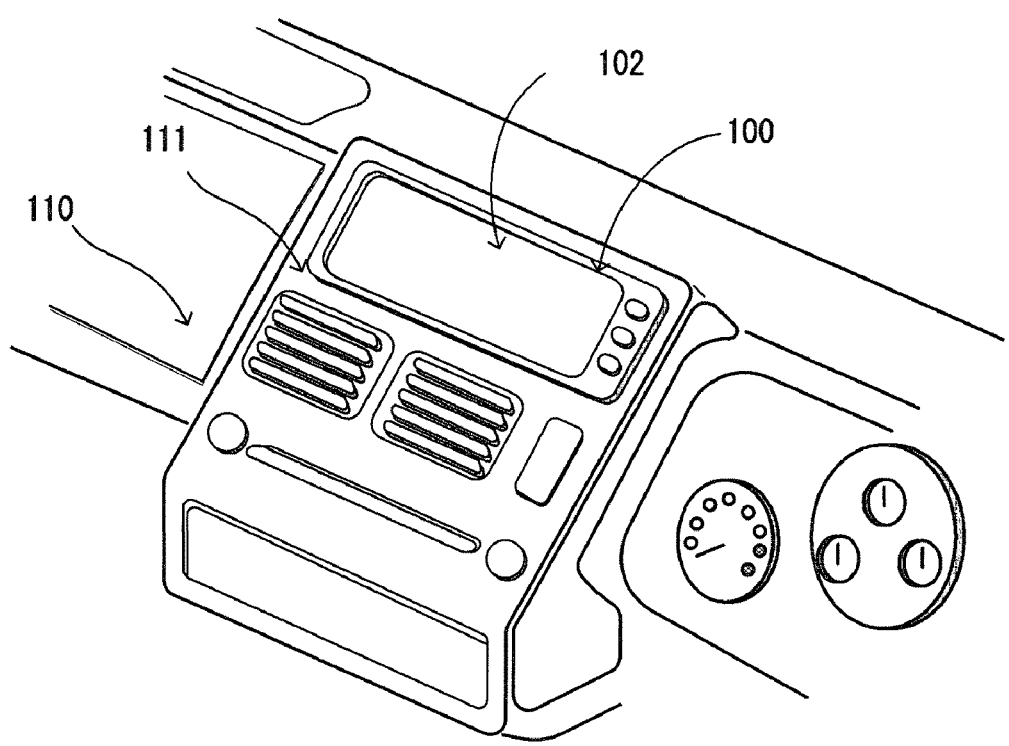
FIG. 1 is an illustration for explaining a mounted state of an angular speed sensor according to the present invention.

FIG. 1 is an illustration for explaining amounted state of the angular speed sensor using the vibration body for the angular speed sensor according to the present invention. In FIG. 1, the navigation system 100 being provided with the angular speed sensor is installed on the console 110 of the vehicle. The console 110 is provided in such a manner that the operation panel 111 is inclined, so as to enhance operability of a driver. The navigation system 100 is also installed in a manner being inclined, along with the operation panel 111, thereby enhancing a visibility of the display 102 for the driver and a fellow passenger.

It is to be noted that the mounted state of the navigation system 100 as illustrated in FIG. 1 is just one example, and this is not the only way of installation. The navigation system may be installed at a position of the opening of air conditioner provided on the operation panel, an upper position of the console 110, on the panel part in front of the passenger seat, or the like.

At any position the navigation system is installed, in order to enhance the visibility of the display 102 of the navigation system 100, the navigation system 100 itself is installed in such a manner as being inclined at an angle with respect to the vertical direction of the vehicle.

The navigation system 100 measures a traveling direction and a travel distance from a predetermined position, whereby it is possible to detect a current position of the vehicle provided with this navigation system 100. In the positioning, the angular speed sensor is used to detect the current position, the traveling direction, or a speed variation of the mobile object.

On this occasion, as a reference for detecting a direction and magnitude of the acceleration, a detection axis is setup for the angular speed sensor. On the premise that this detection axis is parallel to the traveling direction (e.g., road surface), each of the parameters of the angular speed sensor is configured, and the angular speed sensor is placed and fixed in the navigation system.

In general, when the navigation system is installed within the vehicle, a position in the vehicle which is parallel to the horizontal plane (ground surface) is set as a reference. However, some installing positions may require the navigation system to be mounted in a manner being inclined, which is not parallel to the horizontal surface (ground surface). In addition, the angular speed sensor provided in the navigation system is mounted on the premise that the navigation system is positioned in parallel with the horizontal surface (ground surface). Therefore, the inclination of the navigation system causes the inclination of the angular speed sensor, and could be a factor of detection error.

In response to the inclined installation, the angular speed sensor according to the present invention adjusts a mounting angle of the vibrator provided in the angular speed sensor, so as to make the mounting angle of the vibrator to be vertical with respect to the horizontal surface (ground surface).

Figure 2:
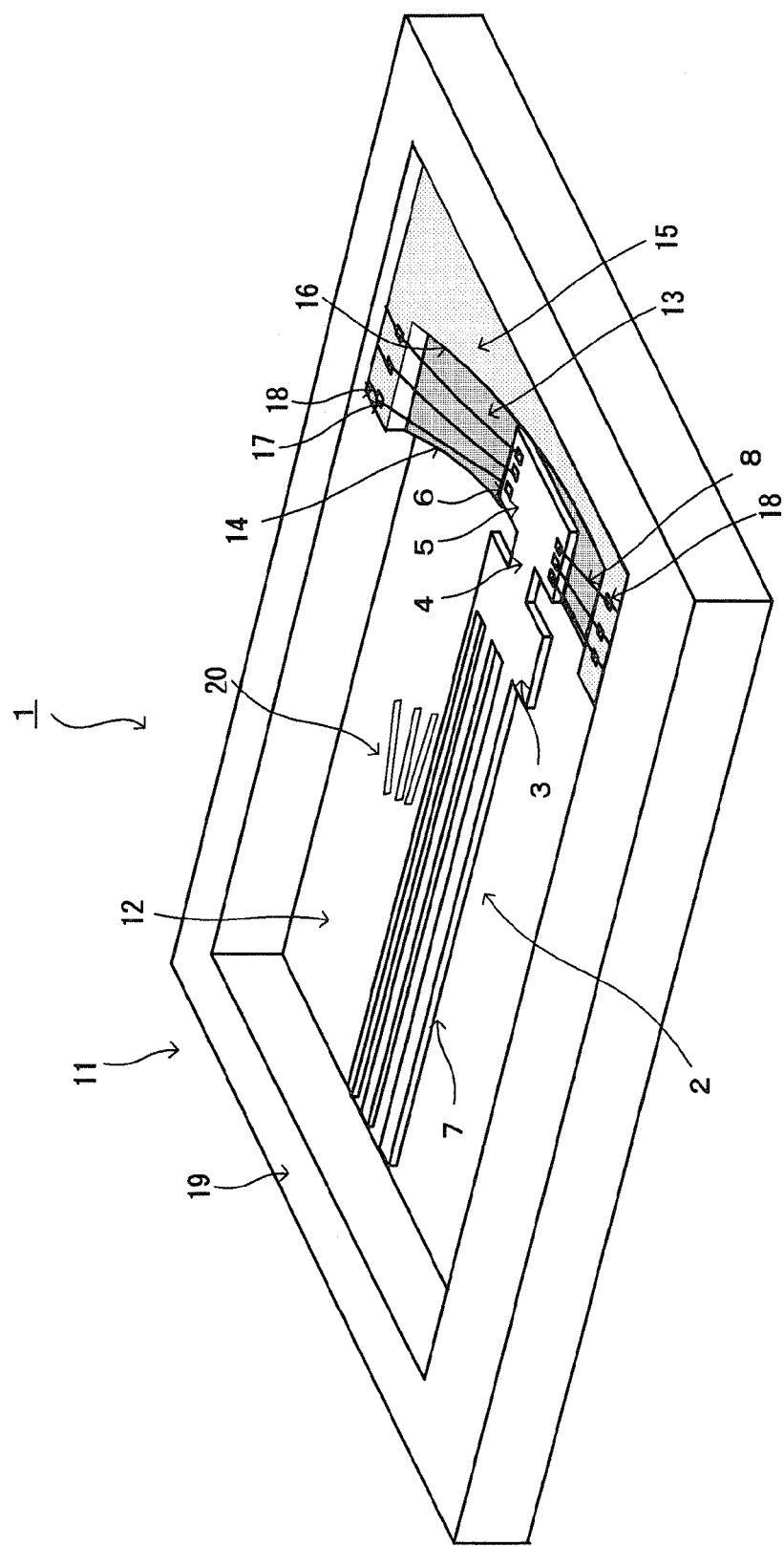
FIG. 2 is an illustration for explaining a vibration body for the angular speed sensor according to the present invention.

FIG. 2 is an illustration for explaining the vibration body for the angular speed sensor according to the present invention. In FIG. 2, a cover part is not illustrated, which in general covers the vibration body 1.

In FIG. 2, the vibration body 1 is provided with a vibrator 2 that constitutes a sensor part for detecting an angular speed, and a mounting substrate 11 that mounts and fixes the vibrator 2 at a predetermined angle.

The vibrator 2 is made of crystal oscillator, and provided with more than one vibration pieces 7, a base part 3 for binding fixed ends of the vibration pieces 7, a supporting part 5 for allowing the vibrator 2 to be supported by and fixed to the mounting substrate 11, and a constricted part 4 that connects the base 3 and the supporting part 5, as well as oscillating following the oscillation of the vibration pieces 7. A width of the constricted part 4 is formed narrower than the width of the base 3 and that of supporting part 5, so as to obtain a preferable oscillation.

In addition, the supporting part 5 is equipped with terminals for supplying driving current to electrodes for driving, which are provided on the vibration pieces 7, and terminals for outputting toward outside, a detected signal from electrodes for detection, which are also provided on the vibration pieces 7. Further, these terminals are connected via wire bonding 8 with contact terminals provided on the wiring part 15 on the mounting substrate 11 side, which will be described below.

The mounting substrate 11 is made of ceramic material, and it is provided with a base part 12 constituting a base portion, a seat part 13 placed on this base part 12, a wiring part 15 provided with the contact terminals 17 and wiring 1B which are electrically connected via the wire bonding 8 with the vibrator 2, and a frame part 19.

The vibrator 2 is mounted by fixing the supporting part 5 onto the seat part 13 of the mounting substrate 11. In mounting the vibrator, the end portion 5a of the supporting part 5 of the vibrator 2 and the edge portion 14 provided on the seat part 13 are aligned, thereby setting the mounting angle of the vibrator 2 to be a predetermined angle.

The seat part 13 has a level difference having a predetermined height from the base part 12, and the seat part is provided with the edge portion 14. The height of the level difference is set to be larger than the oscillation width of the vibration pieces 7, so that the vibration pieces 7 do not come into contact with the base part 12 when the vibration pieces 7 oscillate.

The edge portion 14 determines the mounting position and the mounting angle of the vibrator 2. The tangential direction of the edge portion 14 determines the mounting angle of the vibrator 2, and the position on the edge portion 14 determines the mounting position of the vibrator 2. The mounting position and the mounting angle of the vibrator 2 determined by the edge portion 14 will be described below.

The wiring part 15 is provided with a wall part 16 on the portion facing the seat part 13. This wall part 16 determines the position of the vibrator 2, by being brought into contact with the end portion of the supporting part 5 of the vibrator 2.

Figure 3A:
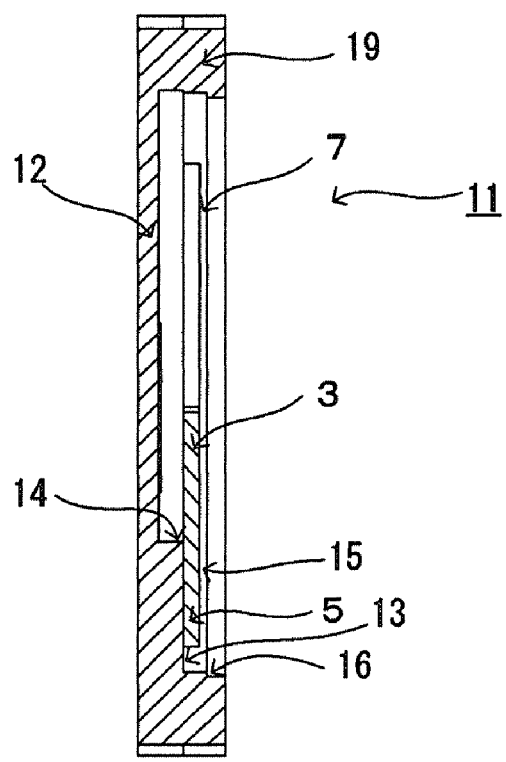
FIG. 3 illustrates sectional views of the vibration body for the angular speed sensor according to the present invention.
Figure 3B:
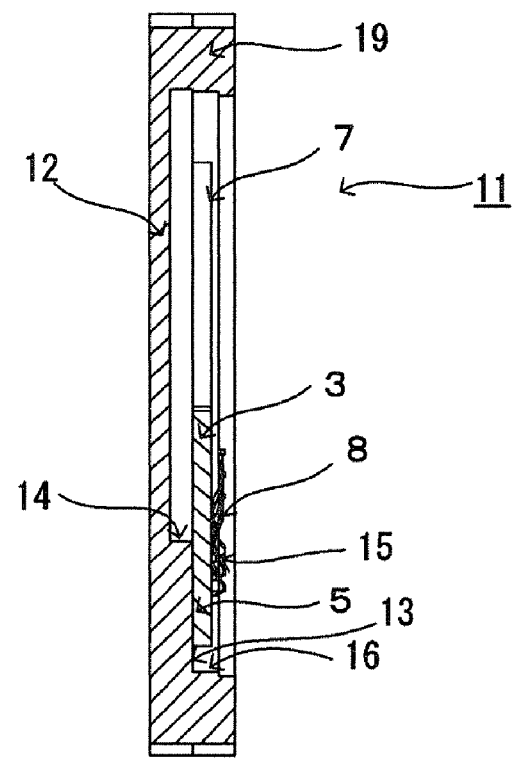

FIG. 3 illustrates sectional views of the vibration body for the angular speed sensor according to the present invention. FIG. 3(A) illustrates a section where there is no wiring between the supporting part and the wiring part, and FIG. 3(B) illustrates a section where there is wiring between the supporting part and the wiring part.

In the sectional views, when the base part 12 is assumed as a lower position, the base part 12, the seat part 13, the wiring part 15, and the upper end of the frame part 19 are placed in this order from the lower side to the upper side. The supporting part 5 of the vibrator 2 is fixed on the seat part 13, and further, there is formed a level difference between the base part 12 and the seat part 13. The wall part 16 is formed between the seat part 13 and the wiring part 15.

It is to be noted that in FIG. 3, the wiring that connects between the vibration pieces 7 and the contact terminals 6 on the supporting part 5 is formed by a print wiring, or the like, and it is not illustrated here.

Next, with reference to FIG. 4, a positional relationship between the seat part and the vibrator will be explained. It is to be noted that in FIG. 4, the vertical direction is assumed as a reference direction defined in the mounting substrate, and if this reference direction is arranged at a slant with respect to the space, the vibrator of the angular speed sensor is also mounted in a manner inclined with respect to this reference direction.

Figure 4:
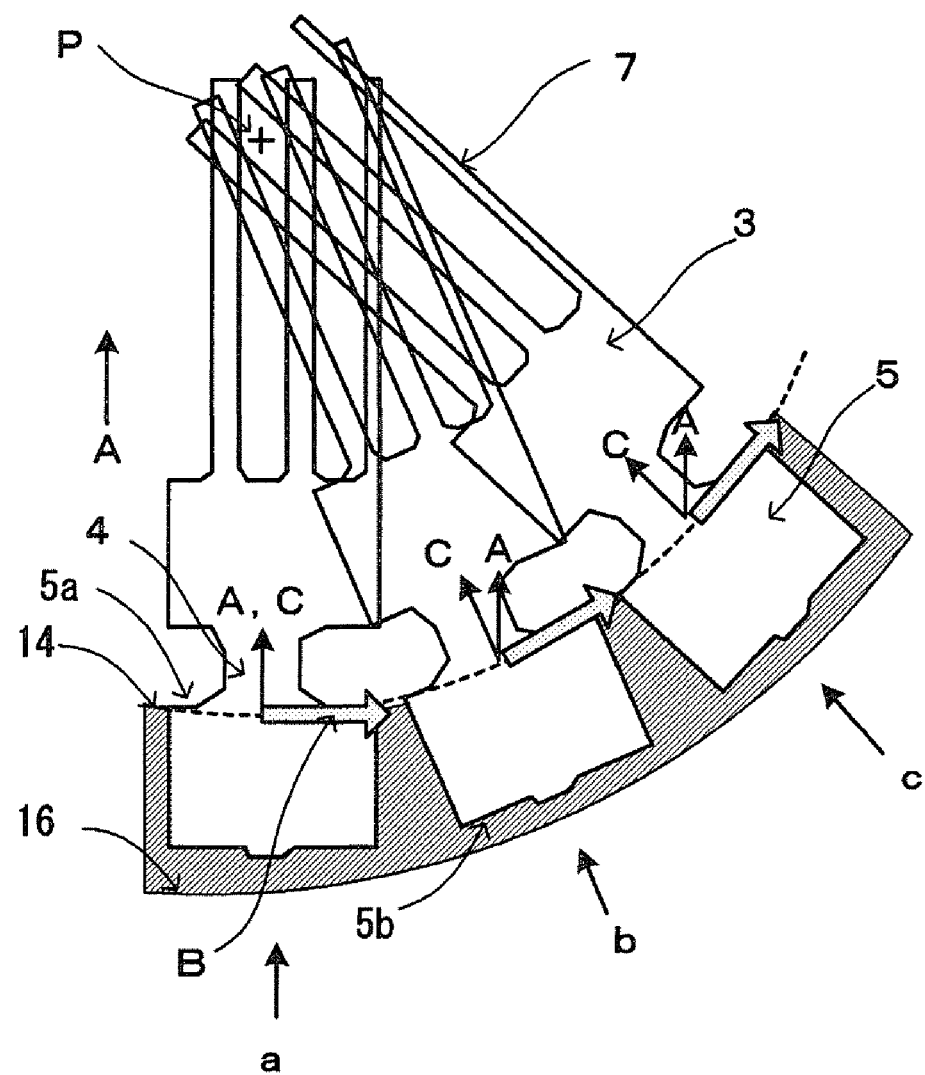
FIG. 4 is an illustration for explaining a positional relationship between a seat part and the vibrator of the vibration body according to the present invention.

In FIG. 4, "A" indicates the reference direction defined in the mounting substrate, "B" indicates the tangential direction on the edge portion of the seat part, and "C" indicates a mounting direction of the vibrator on the mounting substrate.

In FIG. 4, when the angular speed sensor is mounted in the vertical direction, the reference direction A of the mounting substrate coincides with the vertical direction. Therefore, by mounting the vibrator 2 in the same direction as the reference direction A, the vibrator 2 is mounted vertically. FIG. 4(A) illustrates this situation.

On the other hand, when the angular speed sensor is mounted being inclined from the vertical direction, the reference direction A of the mounting substrate is inclined from the vertical direction. Therefore, by mounting the vibrator 2 in such a manner as being inclined by a predetermined angle θ from the reference direction, the vibrator 2 can be mounted vertically. FIG. 4(*b*) and FIG. 4(*c*) illustrate this situation.

On this occasion, the vibrator 2 is arranged along the edge portion 14 of the seat part 13, and thereby the mounting position and the mounting angle can be determined.

Here, the edge portion 14 of the seat part 13 is configured in such a manner that the normal direction of the edge portion 14 coincides with the mounting angle of the vibrator 2. Accordingly, the tangential direction B of the edge portion 14 is orthogonal to the mounting angle of the vibrator 2. Here, the orthogonal direction coincides with the direction of the end portion 5a on the constricted part 4 side of the supporting part of the vibrator 2. Therefore, the inclination of the vibrator 2 is allowed to fit to the predetermined angle θ, by aligning the tangential direction B of the edge portion 14 of the seat part 13 with the side of the end portion 5a of the supporting part 5 of the vibrator 2.

Here, various angle positions that may be taken by the vibrator 2 indicate the places respectively obtained by rotating the vibrator 2 about a virtual rotation center (point P in the figure), which is arbitrarily determined. For example, in FIG. 4, the positions (a), (b), and (c) of the vibrator are the places obtained by rotating the vibrator about the point P in the figure.

Accordingly, the normal line direction at each point of the edge portion 14 is directed to the virtual rotation center P, and the locus of the points is arranged circularly about the virtual rotation center P. Therefore, the edge portion 14 that defines each angle position of the vibrator 2 can be formed by this circular arc shape. The normal line direction at each point on this circular arc shape is directed to the virtual rotation center P. In this circular arc shape, the side of the end portion 5a of the supporting part 5 is aligned with the tangential direction of the circular arc, and thereby the mounting direction C of the vibrator 2 is allowed to be directed to the virtual rotation center P to make the mounting angle in accordance with the inclination of the mounting substrate, and a final direction of the vibrator 2 is rendered to be the vertical direction. In addition, the radius of the circular arc shape can be determined by the distance between the virtual rotation center P and the end portion 5a of the supporting part 5.

In addition, the wall part 16 provided in the rear of the seat part 13 also forms a circular arc shape having a rotation center as the same point for the edge portion 14, and the distance between the virtual rotation center P and the rear end portion 5b of the supporting 5 can be assumed as a radius.

In positioning the vibrator 2 on the seat part 13, it is further possible that the direction of the side of the end portion 5a of the supporting part 5 is aligned with the tangential direction of the edge portion 14, and simultaneously, the rear end portion 5b of the supporting part 5 is made to abut against the wall part 16, and thereby positioning the vibrator 2.

Figure 5B:
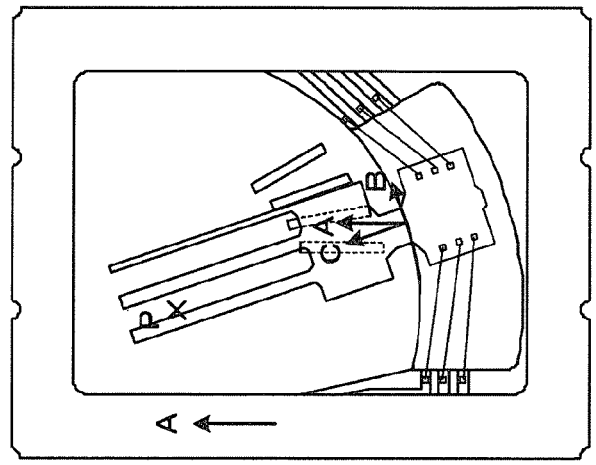
FIG. 5 illustrates a mounted state at each position of the seat part and the vibrator of the vibration body according to the present invention.
Figure 5C:
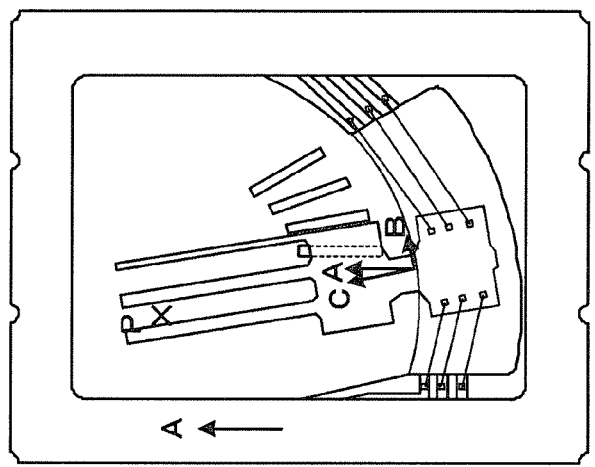
Figure 5A:
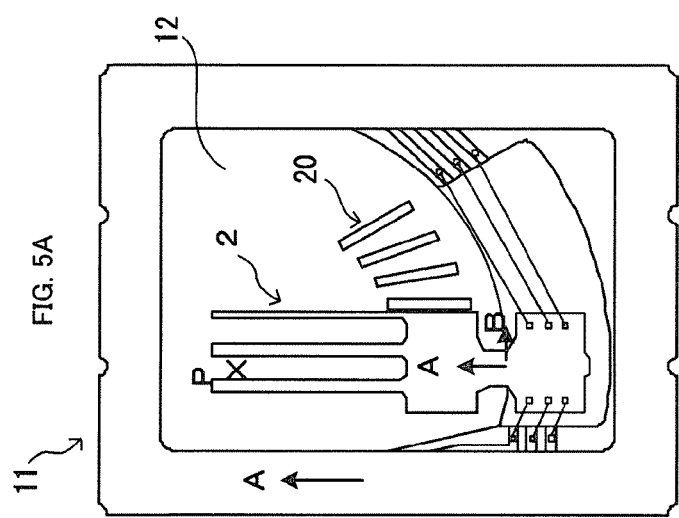

FIG. 5 illustrates a mounting state at each of the positions (a) to (c) as shown in FIG. 4. FIG. 5(A) is associated with the angle position of (a) in FIG. 4, showing a mounting state when the mounting direction C of the vibrator 2 coincides with the reference direction A of the mounting substrate 11. In addition, FIG. 5(B) and FIG. 5(C) are respectively associated with (b) and (c) in FIG. 4, and each illustrates that the mounting direction C of the vibrator 2 is inclined by the angle θ with respect to the reference direction of the mounting substrate 11.

On this occasion, since the mounting substrate 11 in FIG. 5(B) and FIG. 5(C) is inclined by the angle θ with respect to the vertical direction, the vibrator 2 is allowed to be mounted in the vertical direction in each of the cases.

It is to be noted that in FIG. 5, it is determined whether or not a part of the vibrator 2 is aligned with the marker 20, which is provided on the base part 12 of the mounting substrate 11, and thereby checking whether or not the mounting angle of the vibrator 2 corresponds to the predetermined angle.

The marker 20 is provided at a position that aligns with a part of the vibrator 2 when the vibrator 2 is mounted at a predetermined angle. According to the state how the vibrator aligns with this marker, it is possible to check the mounting angle of the vibrator 2 visually or by image recognition.

The vibrator 2 can be mounted onto the mounting substrate 11 by an automatic mechanism, if the position data indicating where the vibrator is mounted in the mounting substrate 11 is acquired in advance, and therefore manual operation is unnecessary. The marker is used as a reference to check the state, when the mounting is performed by the automatic mechanism.

It is to be noted that this marker is provided at a position according to a predetermined mounting angle. For example, this marker may be made of alumina coating (e.g., 15 μm in thickness), or alternatively, it may be formed by printing, by a concave portion, by a convex portion, or by skipping application of metallic skin only as to the marker portion.

A detection signal detected by the vibrator 2 is directly outputted from the vibration body 1 for angular speed sensor outwardly. Alternatively, the detection signal may be subjected to signal processing in the circuit board provided inside, and then outputted. The signal processing performed on the circuit board may include, for example, a signal amplification processing that amplifies a signal level of the detection signal, a signal processing for converting the detection signal into an angular speed signal, various correction processing, or the like.

This circuit board may be configured in such a manner as mounted on the base part 12 of the mounting substrate 11. Accordingly, the circuit board mounted on the base part 12 is positioned on the lower side of the vibrator 2, and the circuit board is visible below the vibrator 2, even when the vibrator 2 is placed in a superimposing manner. In the present invention, the marker is provided on this circuit board, and it is possible to conduct positioning as to the mounting angle of the vibrator, using this marker as an index.

Figure 6:
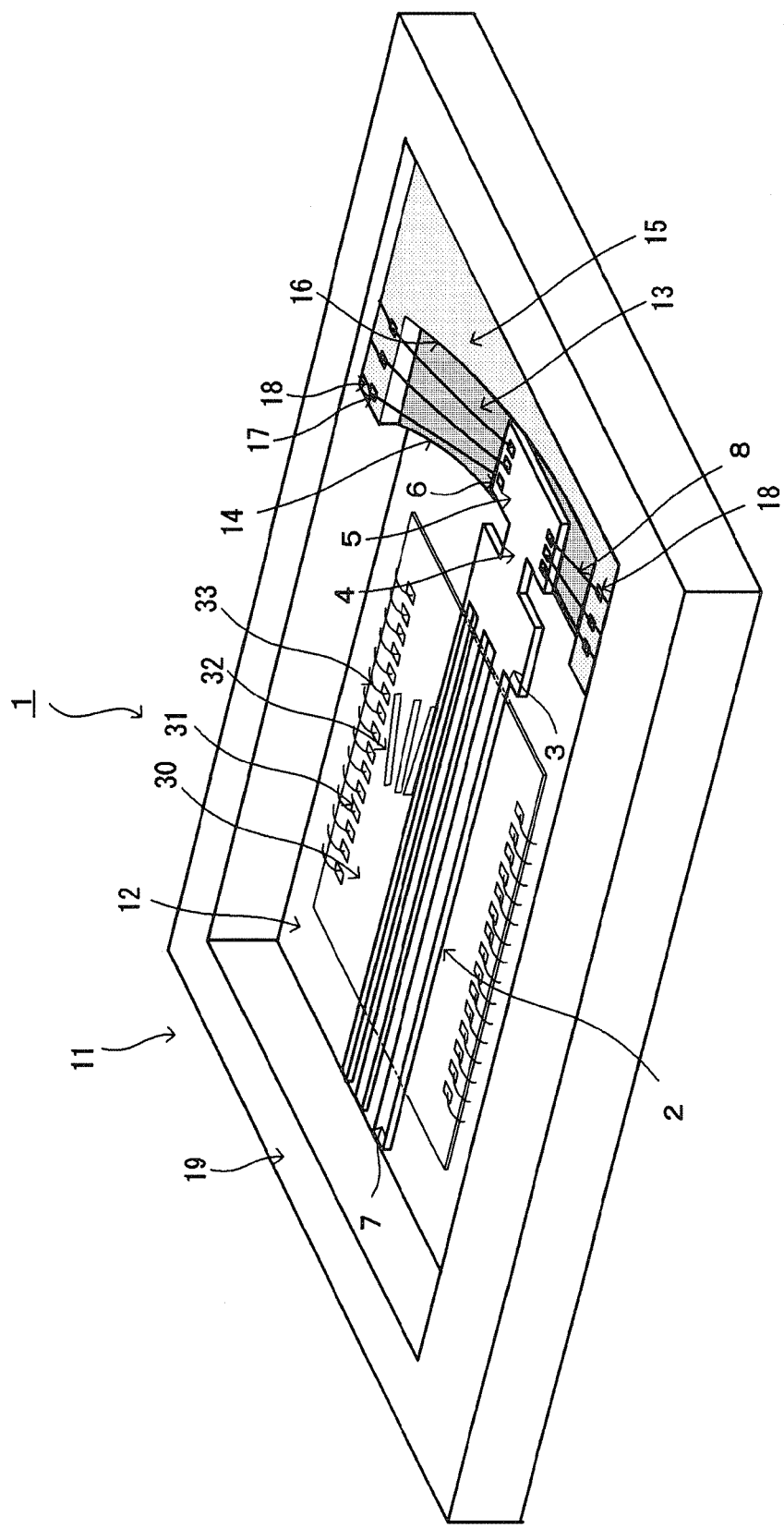
FIG. 6 schematically illustrates a marker provided on a circuit board according to the present invention.
Figure 7:
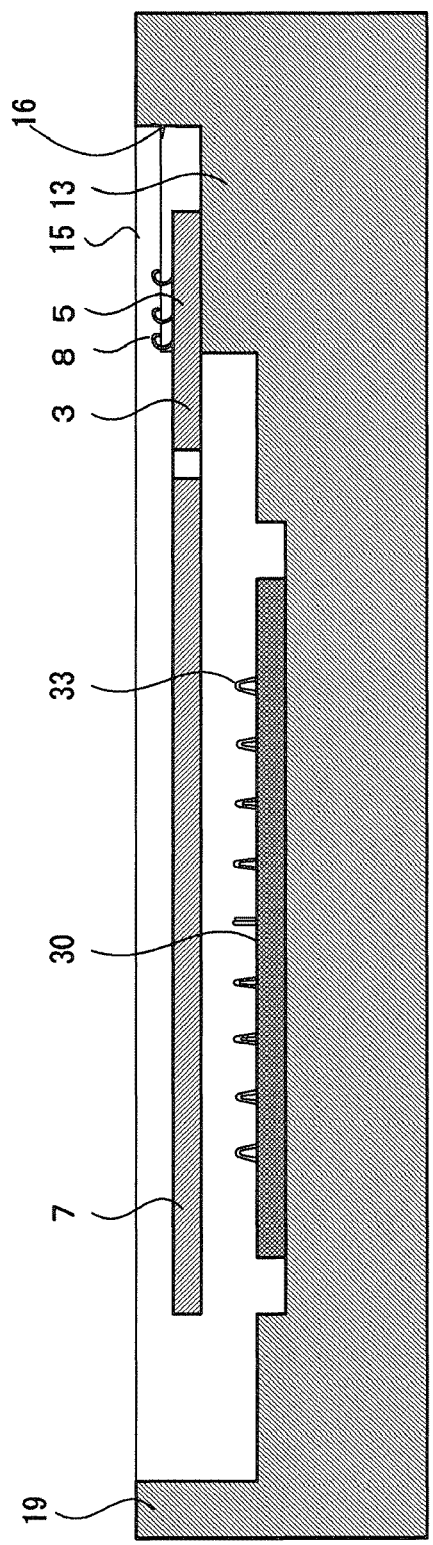
FIG. 7 is a sectional view of the circuit board according to the present invention.

Hereinafter, with reference to FIG. 6 to FIG. 8, the marker provided on the circuit board will be explained. FIG. 6 and FIG. 7 are a schematic view and a sectional view of the marker provided on the circuit board, and FIG. 8 illustrates alignment of the mounting angles of the vibrator by using the marker.

In FIG. 6, the vibration body for angular speed sensor 1 is provided with the circuit board 30 on the base part 12 of the mounting substrate 11, and the marker 32 is mounted on the circuit board 30. It is to be noted here that the configuration shown in FIG. 6 is the same as the configuration shown in FIG. 2, except the circuit board 30. Therefore, in here, only the circuit board 30 and the marker 32 are explained, and tedious explanation will not be given as for the configuration being common.

The circuit board 30 is a substrate mounting a circuit for subjecting the detection signal obtained from the vibrator 2 to a signal processing. On the upper layer surface of the circuit board 30, there is provided a surface protection film such as a polyimide. A contact pad is provided on the lower layer of the surface protection film, and an opening 31 is formed on the surface protection film so as to expose the contact pad externally. Wiring 33 connects between the contact pad (not illustrated) of the circuit board 30 and the contact pad (not illustrated) of the base part 12.

On the surface protection film of the circuit board 30, the opening 31 for the contact pad is formed, and in addition, a marker 32 is formed which is used as an index when the vibrator 2 is mounted at a predetermined angle. The marker 32 can be formed simultaneously when the opening 31 is formed.

FIG. 8 illustrates a state where the circuit board and the vibrator are mounted on the mounting substrate. FIG. 8(A) illustrates the state before the circuit board 30 is mounted, and FIG. 8(B) illustrates the state where the circuit board 30 is mounted on the base part 12. It is to be noted that the position where the circuit board 30 is mounted on the base part 12 is set in advance, and the circuit board 30 is positioned at a predetermined place on the base part 12.

The circuit board 30 has the openings 31 and the marker 32 being formed on the surface protection film, and the lower layer part of the surface protection layer is visible through the opening of the marker 32, which is used as an index to mount the vibrator 2. The marker 32 is formed at a position where the edge portion of the vibration pieces of the vibrator 2 can be parallel with the marker, or a position where the vibration pieces are fitly superimposed on the marker, when the vibrator 2 is mounted at a predetermined mounting angle. The angle and the number of marks of the marker 32 may be determined depending on the magnitude of the mounting angle and a type of the angle.

Figure 8A:
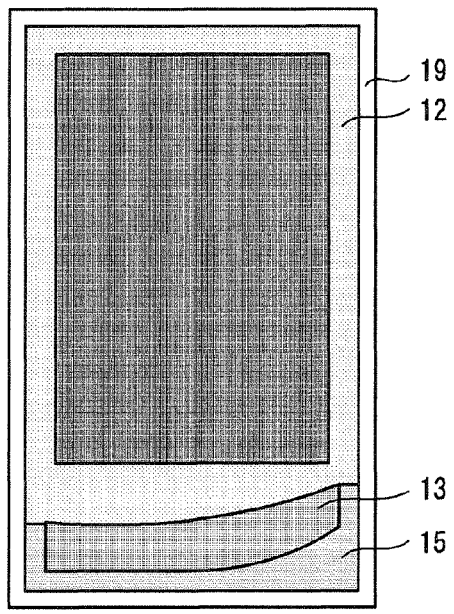
FIG. 8 illustrates position adjustment for each mounting angle of the vibrator, by using the marker according to the present invention.
Figure 8B:
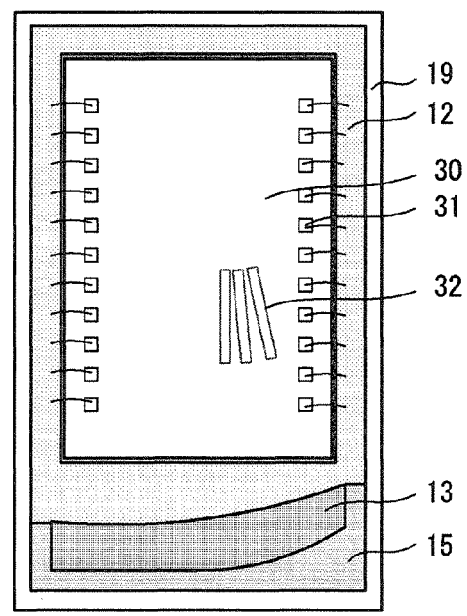
Figure 8C:
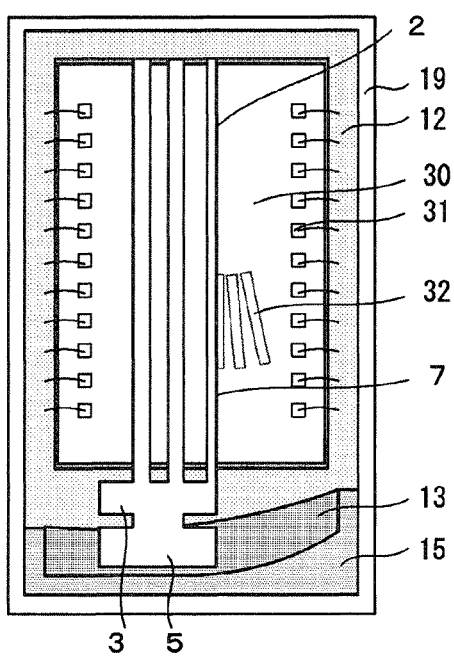
Figure 8D:
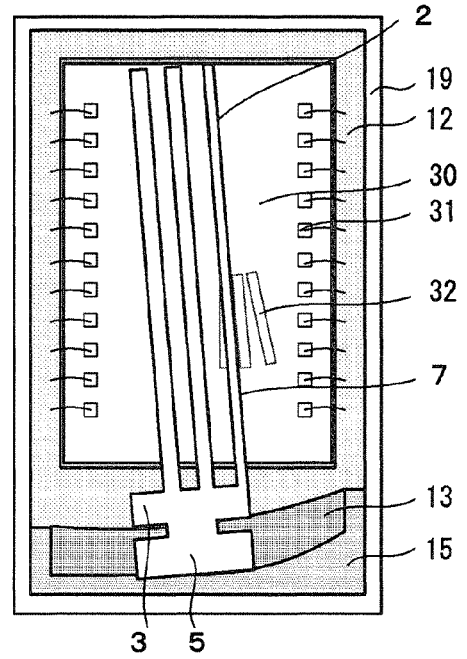

FIG. 8(C) and FIG. 8(D) each illustrates a state where the vibrator 2 is mounted at a predetermined angle, using the marker 32 as a guide. It is to be noted that the mounting angle is set by aligning the edge of the marker 32 with the edge of the vibrator 2. However, it is alternatively possible to set the mounting angle by making the width of the marker 32 to be nearly the same as the width of the vibration piece and aligning the vibrator 2 in such a manner that when the vibrator 2 is superimposed on the marker 32, the marker 32 is made invisible by the vibrator 2.

With reference to FIG. 9, it will be explained how the supporting part of the vibrator is superimposed on the seat part in the situation above.

FIG. 9(A) illustrates a case where the reference direction (here, vertical direction) A coincides with the mounting direction C of the vibrator 2. In this case, the side of the end portion 5a of the supporting part 5 of the vibrator 2 is aligned with the tangential direction of the edge portion 14 of the seat part 13, and thereby preventing a generation of overlaps between the constricted part 4 and the seat part 13, as well as allowing the overall area of the supporting part 5 to cover the seat part 13. Accordingly, it is possible to avoid an effect on the oscillation due to the overlapping between the constricted part 4 and the seat part 13, and bring the total area of the supporting part 5 into contact with the seat part 13 without any waste, achieving a preferable fixing.

On the other hand, FIG. 9(B) illustrates a case where the mounting angle C of the vibrator 2 is inclined with respect to the reference direction (here, vertical direction). On this occasion, since the edge portion 14 is formed in a circular arc shape, the side of the end portion 5a of the supporting part 5 of the vibrator 2 can be aligned with the tangential direction of the edge portion 14 of the seat part 13, thereby establishing a positional relationship similar to FIG. 9(A). Accordingly, as in the case above, it is possible to avoid an effect on the oscillation due to the overlapping between the constricted part 4 and the seat part 13, and bring the total area of the supporting part 5 into contact with the seat part 13 without any waste, achieving a preferable fixing.

The examples as shown in FIG. 4 to FIG. 9 illustrate the case where the virtual rotation center exists within the contour of the vibrator. However, in addition to setting the virtual rotation center at an arbitrary position within the contour of the vibrator, the center may be set outside the contour. FIG. 10 illustrates examples for explaining the positions of this virtual rotation center.

Figure 10A:
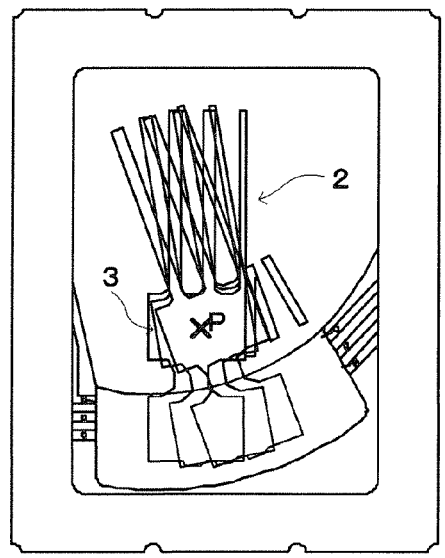
FIG. 10 illustrates a virtual rotation center position according to the present invention.
Figure 10B:
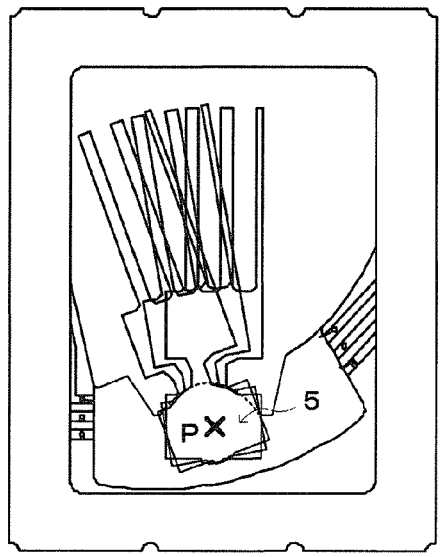
Figure 10C:
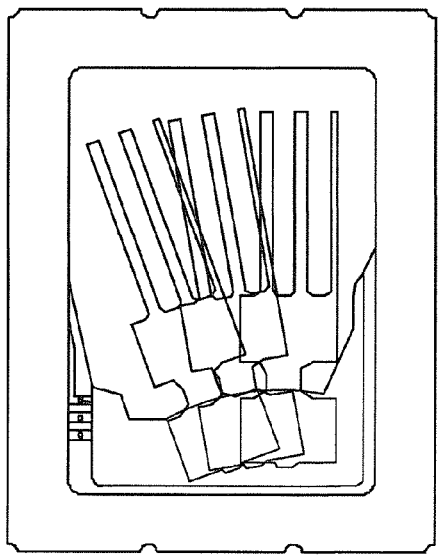

FIG. 10(A) illustrates a case where the virtual rotation center P is located on the base 3 of the vibrator 2. FIG. 10(B) illustrates a case where the virtual rotation center is located on the supporting part 5 of the vibrator 2. FIG. 10(C) illustrates a case where the virtual rotation center P is located outside the vibrator 2. It is to be noted that the curvature of the circular arc shape of the edge portion of the seat part is determined by the position of the rotation center P.

Next, with reference to FIG. 11, a positional relationship between the seat part and the vibrator will be explained, in the case where the virtual rotation center is located outside the contour or the vibrator. It is to be noted here that in FIG. 11, the vertical direction is assumed as the reference direction determined in the mounting substrate, and when the reference direction is used as a standard for inclined arrangement, the vibrator of the angular speed sensor is mounted at a slant in accordance with the reference direction.

Figure 11:
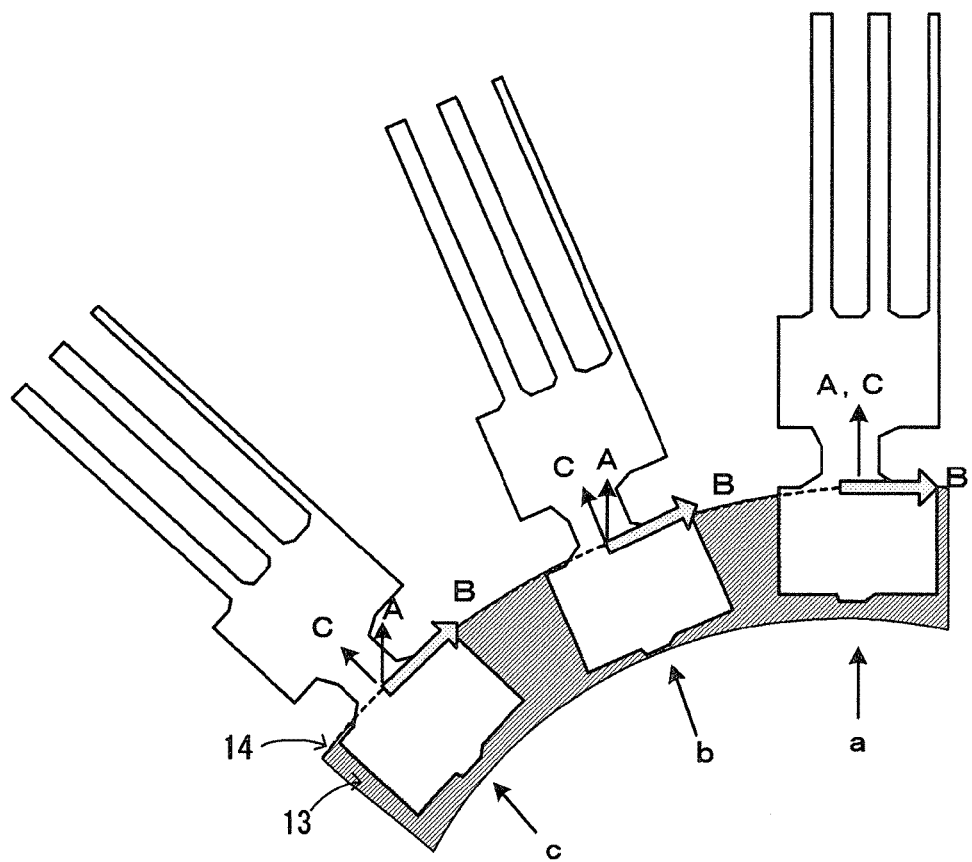
FIG. 11 illustrates the case where the virtual rotation center is located out of the contour of the vibrator, with regard to the positional relationship between the seat part and the vibrator according to the present invention.

In FIG. 11, similar to FIG. 4, "A" indicates the reference direction determined in the mounting substrate, "B" indicates the tangential direction at the edge portion of the seat part, and "C" indicates the mounting direction of the vibrator on the mounting substrate.

In FIG. 11, when the angular speed sensor is mounted in the vertical direction, the reference direction A of the mounting substrate coincides with the vertical direction. Therefore, by mounting the vibrator 2 in the direction being the same as the reference direction A, the vibrator 2 is allowed to be mounted in the vertical direction. FIG. 11(A) illustrates this situation.

On the other hand, when the angular speed sensor is mounted being inclined from the vertical direction, the reference direction A of the mounting substrate is inclined from the vertical direction. Therefore, by mounting the vibrator 2 in such a manner as inclined by a predetermined angle θ from the reference direction A, the vibrator 2 is mounted to be directed to the vertical direction when the vibrator 2 is mounted on the navigation system 100. FIG. 11(B) and FIG. 11(C) illustrate this situation.

On this occasion, the vibrator 2 is arranged along the edge portion 14 of the seat part 13, thereby determining the mounting position and the mounting angle. Here, the edge portion 14 of the seat part 13 is set its normal line direction to fit to the mounting angle of the vibrator 2. Accordingly, the tangential direction B of the edge portion 14 becomes orthogonal to the mounting angle of the vibrator 2. This direction being orthogonal thereto coincides with the direction of the end portion 5a on the constricted part 4 side of the supporting part 5 of the vibrator 2, and therefore, by aligning the tangential direction of the edge portion 13 of the seat part with the side of the end portion 5a of the supporting part 5, thereby allowing the inclination of the vibrator 2 to agree with the predetermined angle θ.

Here, at various angle positions available for the vibrator 2, the vibrator 2 at each position can be arranged, assuming that the vibrator is rotated about a virtually configured rotation center (point P in the figure), which is arbitrary determined. For instance, in FIG. 11, it is possible to assume that the vibrator at each of the rotated positions (a), (b), and (c) is placed at the position that is obtained by rotating the vibrator about the point P in the figure.

Accordingly, the normal line direction at each point on the edge portion 14 is directed to the virtual rotation center P outside the contour of the vibrator 2, and the locus of the points is arranged in a circular arc shape about the virtual rotation center P. Therefore, the edge portion 14 that determines each angle position of the vibrator 2 can be formed in a shape of circular arc which is curved outwardly. The normal line direction at each point of this circular arc shape is directed to the virtual rotation center P. On this circular arc shape, by aligning the side of the end portion 5a of the supporting part 5 with the tangential direction of the circular arc, the mounting direction C of the vibrator 2 is directed to the virtual rotation center P, establishing the mounting angle according to the inclination of the mounting substrate, and then, a finally, the vibrator 2 can be directed to the vertical direction. In addition, the radius of the circular arc shape can be determined by the distance between the virtual rotation center P and the end portion 5a of the supporting part 5.

In addition, the wall part 16 provided in the rear of the seat part 13 also has a circular arc shape, using a rotation center which is the same as the rotation center for the edge portion 14, and the distance between the virtual rotation center P and the rear end portion 5b of the supporting part 5 can be assumed as a radius.

When the vibrator 2 is positioned on the seat part 13, it is further possible to align the direction of the side of the end portion 5a of the supporting part 5 with the tangential direction of the edge portion 14, and simultaneously allow the rear end portion 5b of the supporting part 5 to abut against the wall part 16, whereby the position of the vibrator 2 can be determined.

Figure 12:
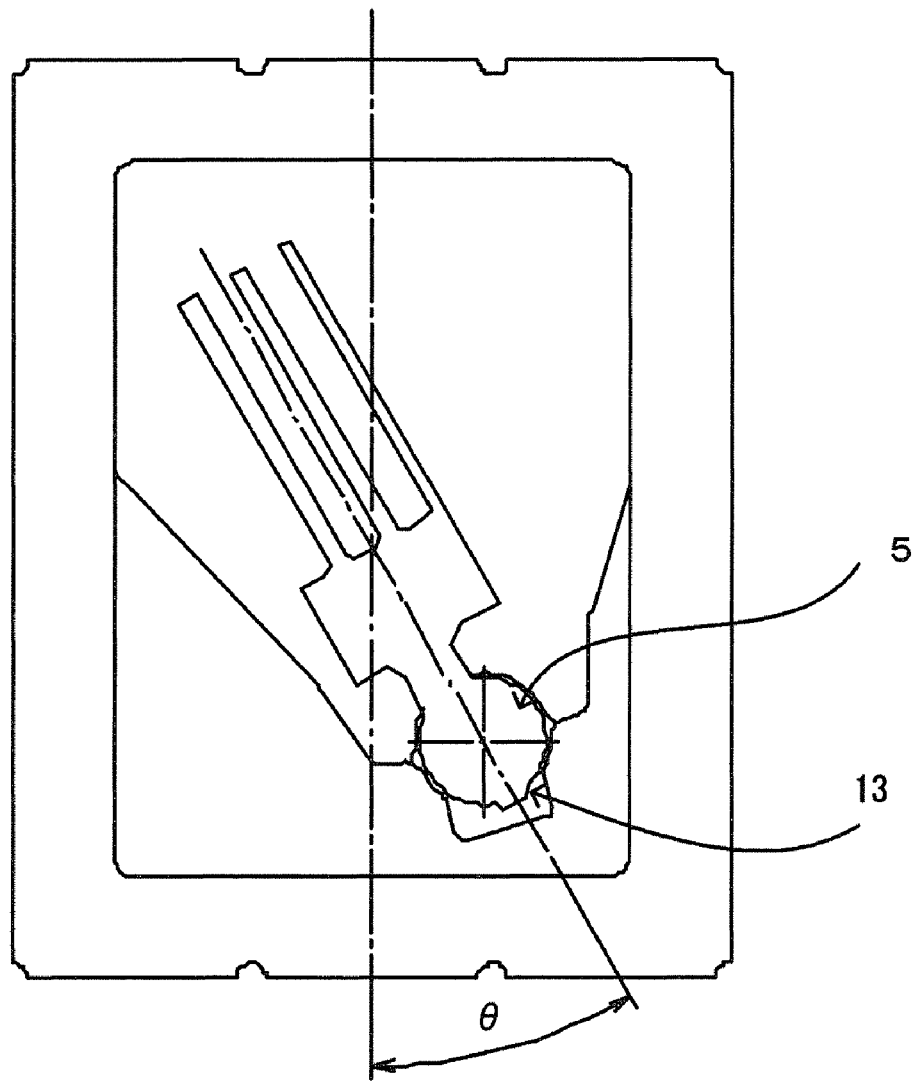
FIG. 12 illustrates the case where the virtual rotation center P is located on the supporting part of the vibrator according to the present invention.

FIG. 12 illustrates an example of FIG. 10(B), showing that the virtual rotation center P is located on the supporting part of the vibrator.

In the case above, the shape of the supporting part 5 of the vibrator 2 is rendered to be nearly a circular shape except a joining section with the constricted part 4. In addition, the shape of the seat part 13 is also rendered to be a circular shape so as to have at least a portion overlapping the circular shape portion of the supporting part 5, the radius being the same therebetween, when the vibrator is mounted at a predetermined angle position. Accordingly, when the virtual rotation center P is located on the supporting part 5 of the vibrator, the supporting part 5 is aligned with the seat part 13, by fitting the periphery of one circular shape of the supporting part to the periphery of the circular shape of the seat part, thereby mounting the vibrator at a predetermined angle.

Figure 13:
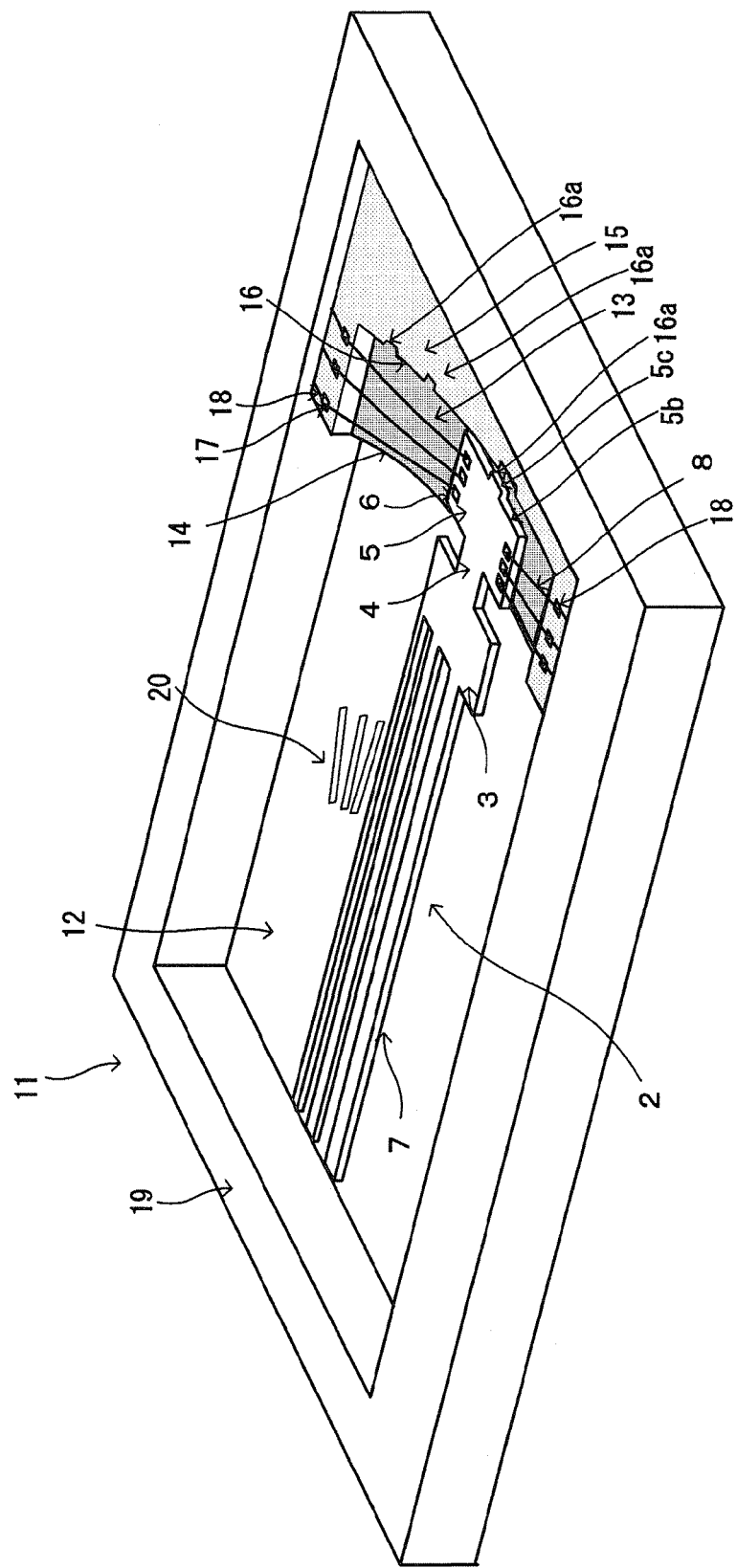
FIG. 13 illustrates a concave portion that is provided on the wall part of the vibration body according to the present invention.
Figure 14A:
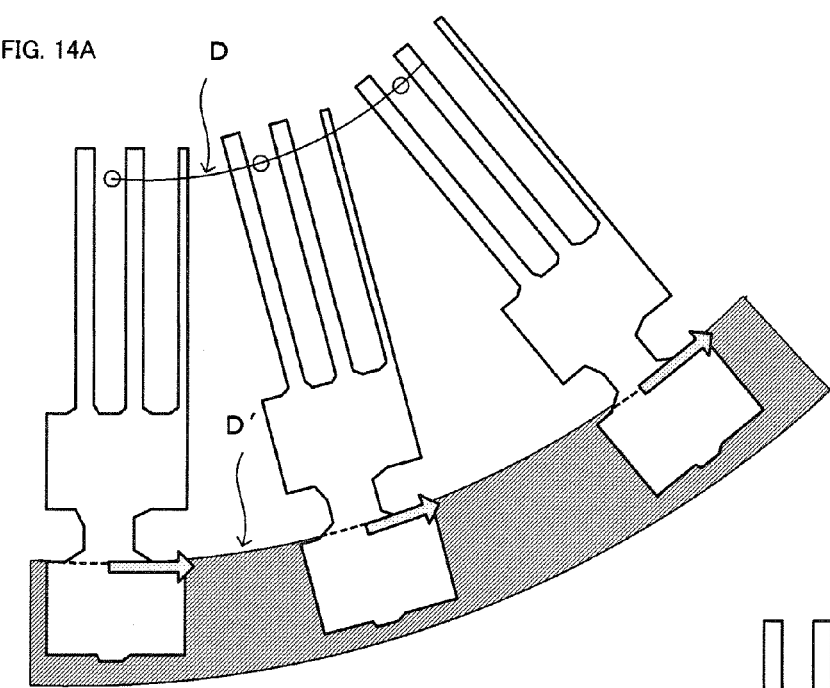
FIG. 14 illustrates a concave portion that is provided on the wall part of the vibration body according to the present invention.
Figure 14B:
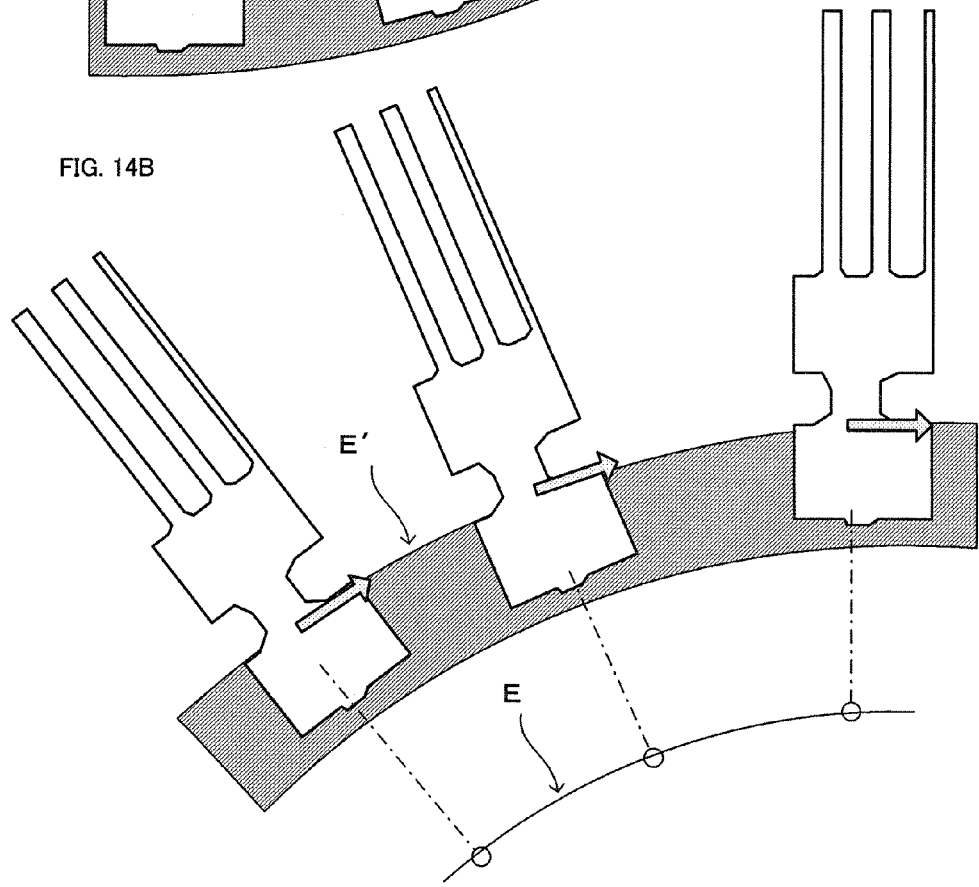

In addition, FIG. 13 and FIG. 14 are illustrations to explain a concave portion which is provided on the wall part. When the vibrator 2 is formed, more than one vibrator 2 is made from one piece of crystal substrate, in general. In the process of forming such vibrators, multiple vibrators 2 are joined via one part on a frame, and the vibrators 2 are separated from the frame, so that individual vibrators 2 are formed. On this occasion, a part having been a joint with the frame may remain on the vibrator 2, in a form of a projecting portion 5c that is referred to as "burr".

Generally, this burr portion is formed on the supporting part 5 that may not cause any problem in forming the vibration pieces 7. In the configuration described above, a position of the supporting part 5 is determined by allowing the rear end portion 5b of the supporting part 5 to abut against the wall part 16 that is provided in the rear of the seat part 13, and accordingly, the position of the vibrator 2 is determined. In such a case, the projecting portion 5c of this burr provided in this supporting part 5 may cause an error in performing the positioning.

Given the situation above, an embodiment of the vibration body for angular speed sensor according to the present invention has a configuration for avoiding the projecting portion 5c of the burr, and therefore, preventing a displacement due to the abutment of the projecting portion 5c against the wall part 16.

In FIG. 13 and FIG. 14, there is provided a concave portion 16a on the wall part 16 at the position where the projecting portion 5c of the supporting part 5 abuts against, so that the projecting portion 5c can be avoided when the vibrator 2 is mounted at a predetermined angle. With this configuration, when the rear end 5b of the supporting part 5 abuts against the wall part 16, the concave portion 16a accommodates the projecting portion 5c, thereby avoiding the abutment of the projecting portion 5c against the wall part 16.

It is to be noted that the concave portion 16a is placed at each of the positions respectively in association with the predetermined mounting angles.

In the vibration body for angular speed sensor according to the present invention, each example above is described in the case where one virtual rotation center exists for each mounting angle of the vibrator. However, there is another embodiment, that is, virtual rotation centers at respective mounting angles of the vibrator are joined successively.

Figure 15A:
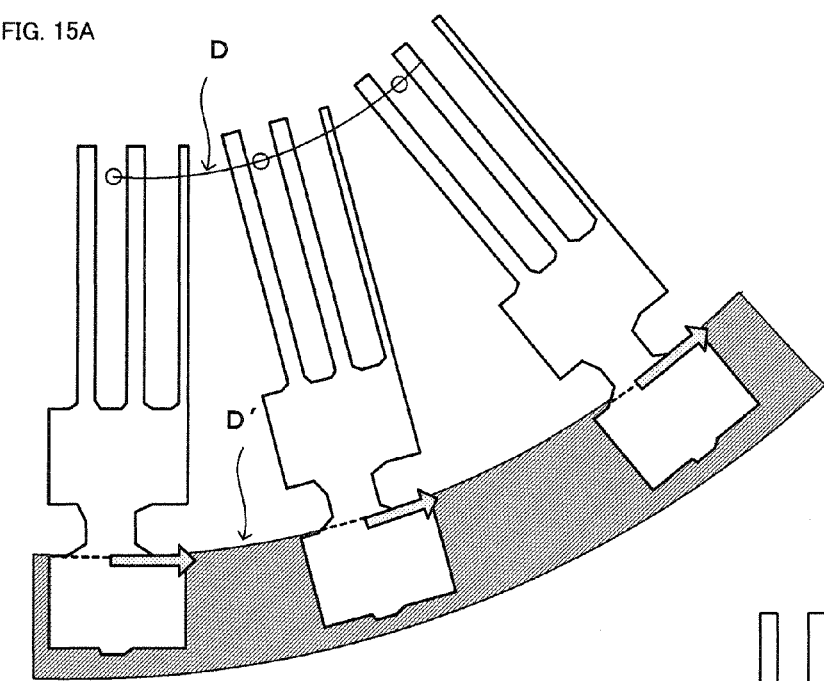
FIG. 15 illustrates a state in which the virtual rotation centers are successively connected, with respect to each mounting angle of the vibrator according to the present invention.
Figure 15B:
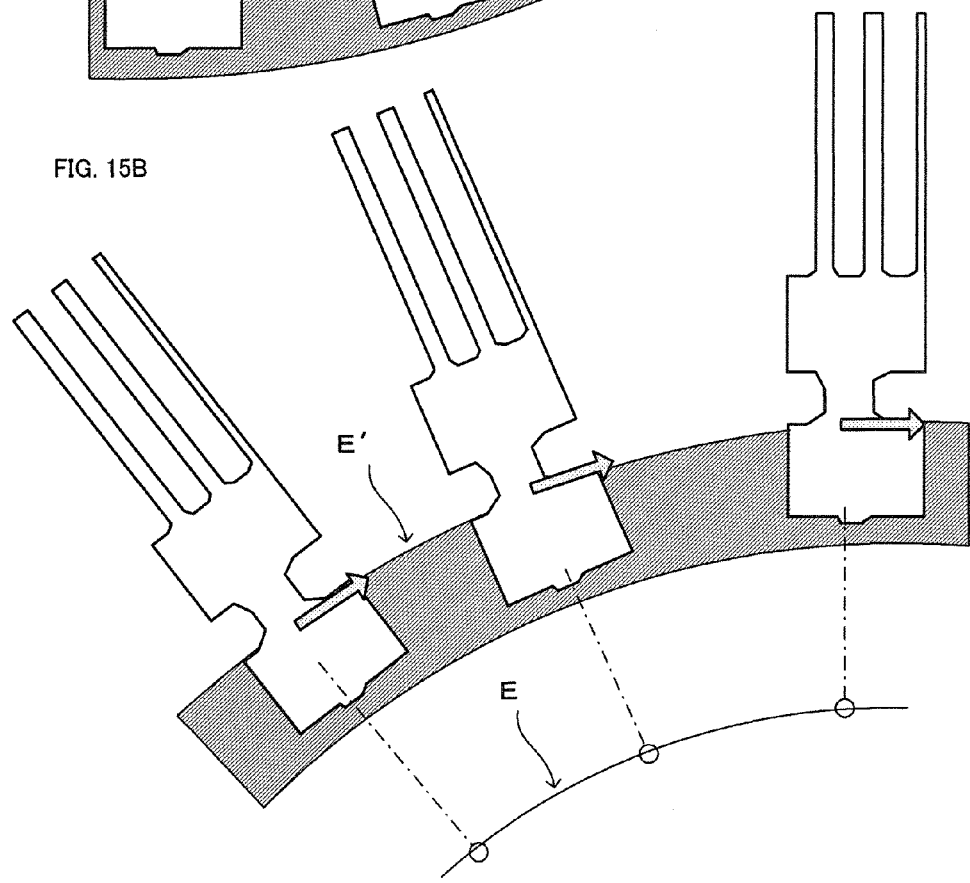

FIG. 15(A) illustrates that a curved line D formed by joining the virtual rotation centers is located on the side of the vibration pieces of the vibrator 2. FIG. 15(B) illustrates a curved line E formed by joining the virtual rotation centers is located on the extension of the supporting part 5 of the vibrator 2.

In the configuration example described above, since the virtual rotation center is only one, the curved line constituting the edge portion 14 of the seat part 13 forms a curved line like a circular arc. However, in FIG. 15(A) and FIG. 15(B), the virtual rotation centers exist on the curved line D or on the curved line E, the curved line constituting the edge portion 14 becomes D' or E' which are formed along with the curved line D or the curved line E.

Also in this configuration, mounting of the vibrator 2 by using this curved edge portion 14 may be the same as the mounting by using the circular arc edge portion as described above, and therefore tedious explanation will not be given here.

Figure 16:
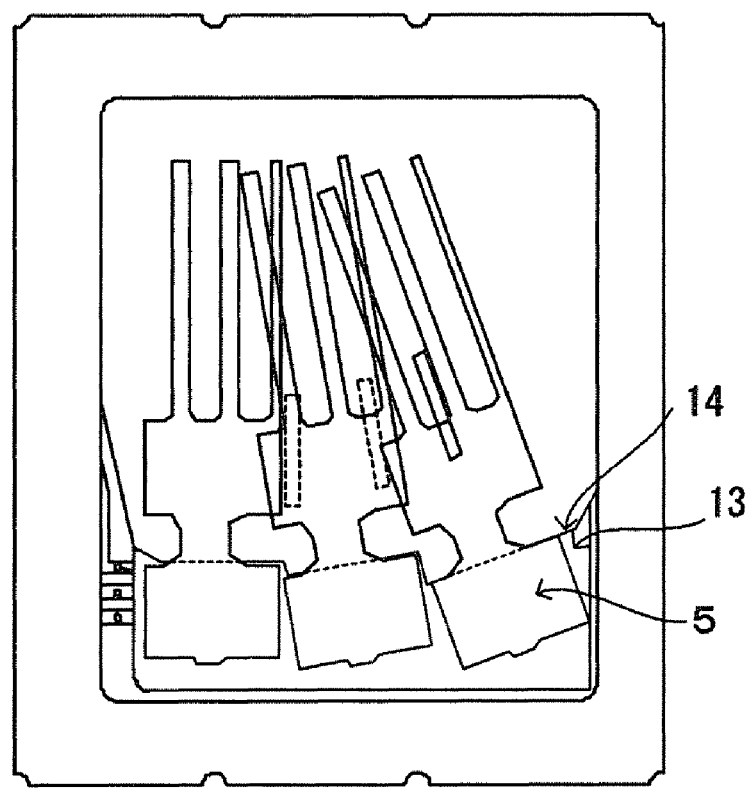
FIG. 16 illustrates a configuration where the edge portion of the seat part of the vibration body according to the present invention is made up of more than one straight line.
Figure 18A:
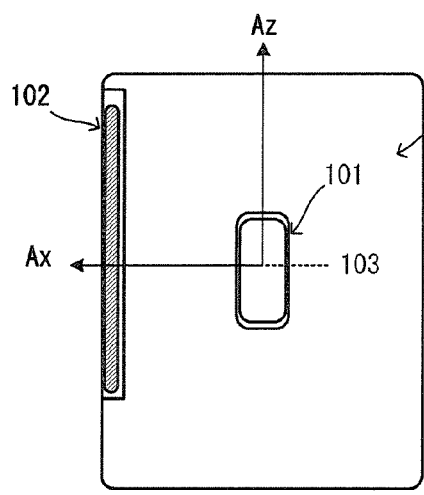
FIG. 18 is a sectional view when a navigation system is mounted on a central console.
Figure 18B:
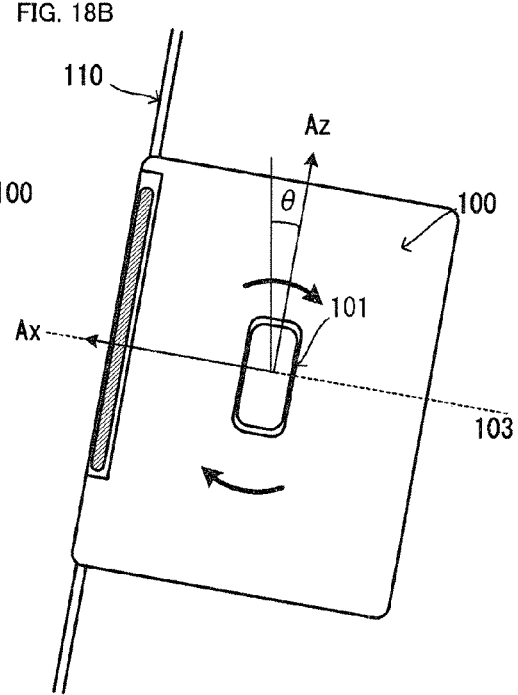
Figure 18C:
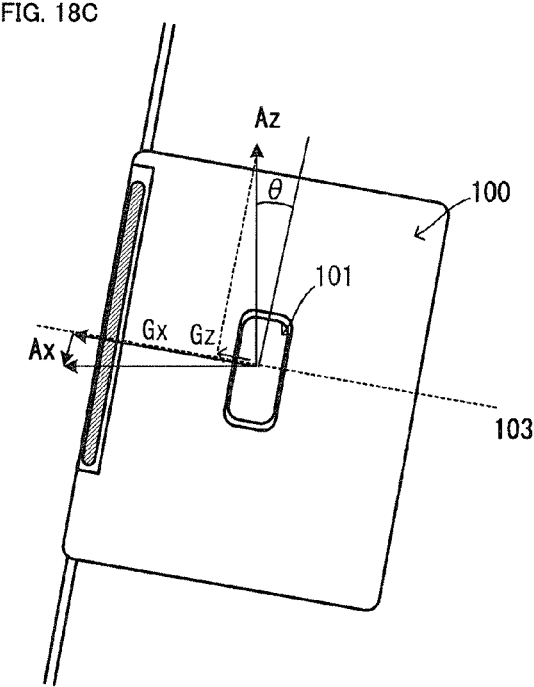
Figure 19A:
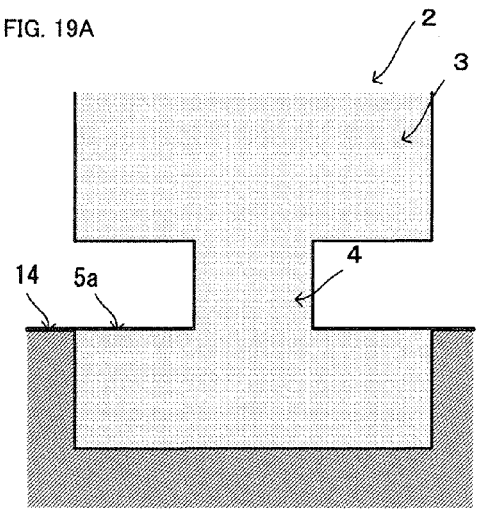
FIG. 19 illustrates a positional relationship between the supporting part of the vibrator and the seat part.
Figure 19B:
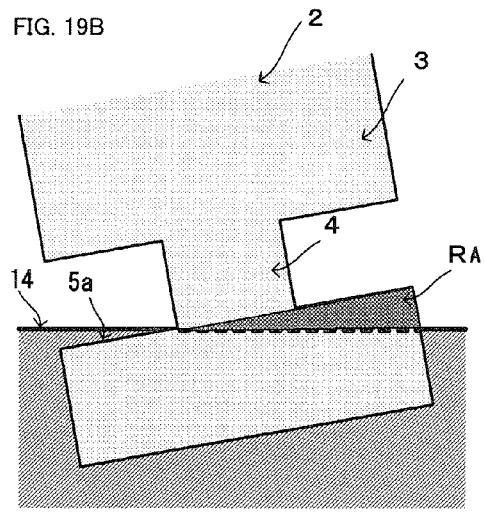
Figure 19C:
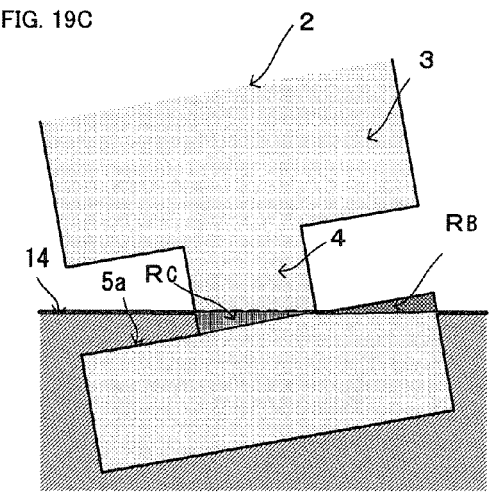
Figure 19D:
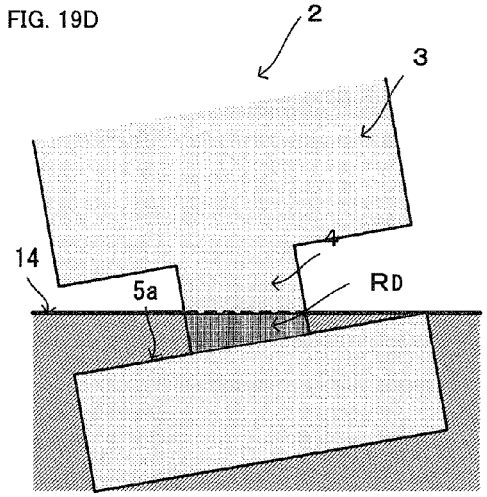

In addition, the configuration example described above illustrates that the edge portion of the seat part has a circular arc shape with a single center, or a curved line shape made up of joining multiple circular arcs each having a virtual rotation center that is not stabilized but moves on a curved line. However, it is further possible to configure such that multiple straight lines are joined together. FIG. 16 and FIG. 17 illustrate the case where the shape of the edge portion of the seat part has a configuration that is formed by joining multiple straight lines.

FIG. 16 is a configuration example that allows the vibrator to be mounted at multiple (three in the figure) mounting angle positions. The edge portion 14 of the seat part 13 is formed by combining lines being in the same direction as the end portion 5a of the supporting part 5 of the vibrator 2 at each mounting angle position.

In this configuration example, it is not possible to determine the mounting angle of the vibrator at an arbitrary position on the edge portion of the seat part, but it is selectable from the predetermined mounting angles.

In the case where the shape of the edge portion is curved, a small amount of undesirable portion may be generated, such as a portion where the constricted part overlaps the seat part when the end portion of the supporting part of the vibrator is superimposed on the seat part, or a portion of the seat part that does not contribute to fixing due to non-overlapping with the supporting part. However, according to the present configuration, the edge portion of the seat part has a linear shape, and therefore being the same shape as the end portion of the supporting part of the vibrator. Therefore, it is possible to eliminate the occurrence of such undesirable portion due to the curved shape as described above.

FIG. 17 illustrates a configuration example in which the vibrator can be mounted at multiple mounting angle (three in the figure), and each angle position for mounting the vibrator is provided in stepwise, in the thickness direction of the vibration body for angular speed sensor.

FIG. 17(A) is a front view and FIG. 17(B) is a sectional view. This configuration corresponds to the embodiment in which the virtual rotation center is provided deep in the left side. The height of the seat part 13 varies to form multiple levels, and the seat part is formed in such a manner as having different mounting angles at the respective levels.

Also in this configuration, mounting of the vibrator 2 by using the linear edge portion 14 may be the same as the mounting by using the circular arc edge portion as discussed above, and therefore tedious explanation will not be given here.

With the configuration above, the vibrators are arranged along with approximately the reference direction (vertical direction in the figure), and therefore in the mounting substrate, the width of the direction orthogonal to the reference direction (horizontal direction in the figure) can be narrowed.

INDUSTRIAL APPLICABILITY

The angular speed sensor having the vibration body unit according to the present invention can be applied to a posture control for a mobile object such as an airplane and a vehicle, a navigation system, or the like.

What is claimed is:

1. A vibration body for angular speed sensor, comprising:
a vibrator having vibration pieces,
a supporting part for supporting the vibration pieces, and
a mounting substrate for mounting the vibrator,
wherein the mounting substrate comprises a seat part for fixing the supporting part and supporting the vibrator and a base part, the seat part has a level difference representing a predetermined height from the base part, said predetermined height is set larger than an oscillation width of the vibration pieces, said seat part also comprises, on the side of the vibrator pieces, an edge portion having a shape of a curved line, an end portion of supporting part of the vibration coincides with the edge portion thereof, each normal line in a direction perpendicular to a tangential direction of the curved line at each position on the edge portion determines a mounting angle for mounting the vibrator and has an angle in the same direction as a reference direction defined in the mounting substrate or in a direction at least one being different therefrom, and the overall area of the supporting part covers the seat part so that a positional relationship between the seat part to which the vibrator is fixed and the supporting part of the vibrator being kept constant.

2. The vibration body for angular speed sensor, according to claim 1, wherein, in mounting the vibrator on the seat part, tangential directions of both an end portion of the supporting part on the vibration pieces side and the edge portion of the seat part coincide with each other at a mounting position being selected from the edge portion, and according to position adjustment between the end portion and the edge portion, the mounting angle of the vibrator on the mounting substrate is determined by the normal line direction that is perpendicular to a tangential direction of the curved line of the edge portion of the seat part.

3. The vibration body for angular speed sensor, according to claim 1, wherein, the shape of the curved line of the edge portion has a circular arc shape, and a center of the circular arc shape corresponds to a rotation center that is virtually defined so as to select one position as a mounting position of the vibrator on the mounting substrate, out of multiple positions which are taken by the vibrator when the vibrator is rotated about the center.

4. The vibration body for angular speed sensor, according to claim 3, wherein, the rotation center is on a contour of the vibrator or inside thereof.

5. The vibration body for angular speed sensor, according to claim 3, wherein, the rotation center is outside a contour of the vibrator.

6. The vibration body for angular speed sensor, according to claim 1, wherein, the shape of the curved line of the edge portion corresponds to a curved line shape that is formed by an end portion of the supporting part of the vibrator, along with a locus formed by joining the mounting positions that are taken successively, out of multiple mounting positions taken by the vibrator on the mounting substrate, and a center and a radius of the curvature at each position on the curved line respectively correspond to a rotation center that is virtually defined by the vibrator at each of the successive mounting positions, and a distance from the rotation center to the end portion of the supporting part.

7. The vibration body for angular speed sensor, according to claim 1, wherein, a range of the mounting angle is at least 30 degrees.

8. The vibration body for angular speed sensor, according to claim 1, wherein, the base part has at least one marker on a surface for mounting the vibrator, the marker aligning with a part of the contour of the vibrator, when the vibrator is mounted at a predetermined angle.

9. The vibration body for angular speed sensor, according to claim 1, wherein, the base part comprises a circuit board, and the circuit board has at least one marker that aligns with a part of the contour of the vibrator, when the vibrator is mounted at a predetermined angle.

10. The vibration body for angular speed sensor, according to claim 9, wherein, the marker is formed by an opening that is provided on a surface protection film on the circuit board.

11. The vibration body for angular speed sensor, according to claim 3, wherein, the seat part comprises a wall part having a curved line shape that is formed by a rear end portion of the supporting part of the vibrator along with a locus formed by joining mounting positions successively taken by the vibrator out of the multiple positions on the mounting substrate, and the wall part abuts against the rear end portion of the supporting part of the vibrator, allowing the positioning of the vibrator in a longitudinal direction.

12. The vibration body for angular speed sensor, according to claim 11, wherein, the wall part comprises at least one concave portion associated with a projecting portion that is provided on an end portion of the supporting part of the vibrator, in accordance with a predetermined mounting angle of the vibrator.

13. A vibration body for angular speed sensor comprising a vibrator having vibration pieces and a supporting part for supporting the vibration pieces, and a mounting substrate for mounting the vibrator, wherein, the supporting part of the vibrator has a shape made up of a part of circular shape, the mounting substrate comprises a seat part for fixing the supporting part and supporting the vibrator, and a base part, the seat part in the mounting substrate for fixing the supporting part to support the vibrator has a level difference larger than an oscillation width of the vibration pieces from the base part of the mounting substrate, and the seat part has a circular shape having the same radius as the circular shape of the supporting part of the vibrator, and a center of the circular shape of the seat part is set to be a rotation center that is defined virtually by the vibrator, when the vibrator is mounted on the mounting substrate at different angles.

14. The vibration body for angular speed sensor, according to claim 13, wherein, the seat part comprises a wall part having a circular arc shape, having a center being the same as a center of the circular shape of the supporting part, a radius obtained by adding an allowance to the radius of the circular shape of the supporting part, and surrounding a part of the circular shape, and the wall part is engaged with a circular shape portion of the supporting part of the vibrator, so as to perform the positioning of the supporting part of the vibrator.

15. The vibration body for angular speed sensor, according to claim 14, wherein, the wall part comprises at least one concave portion that is associated with a projecting portion provided to an end portion of the supporting part of the vibrator, in accordance with a predetermined mounting angle of the vibrator.

16. A vibration body for angular speed sensor, comprising:

a vibrator having vibration pieces, a supporting part for supporting the vibration pieces, and a mounting substrate for mounting the vibrator, wherein the mounting substrate comprises a seat part for fixing the supporting part and supporting the vibrator and a base part, the seat part has a level difference representing a predetermined height from the base part, said predetermined height is set larger than an oscillation width of the vibration pieces, said seat part also comprises, on the side of the vibration pieces, an edge portion having a shape made up of a combination of multiple straight lines, and each normal line in a direction perpendicular to the straight line at each position on the edge portion has an angle in the same direction as a reference direction defined in the mounting substrate, or in a direction at least one being different therefrom, and an end portion of the vibrator is aligned with a straight line, whereby the vibrator can be mounted at a mounting angle being selected, a positional relationship between the seat part to which the vibrator is fixed and the supporting part of the vibrator being kept constant.

17. The vibration body for angular speed sensor, according to claim 16, wherein, in mounting the vibrator on the seat part, tangential directions of both an end portion of the supporting part on a side of the vibration pieces and the edge portion of the seat part coincide with each other at a mounting position being selected from the edge portion, and according to position adjustment between the end portion and the edge portion, a mounting angle of the vibrator on the mounting substrate is determined by a normal line direction of the edge portion of the seat part.

* * * * *